(12) United States Patent
Dong et al.

(10) Patent No.: US 10,040,005 B2
(45) Date of Patent: Aug. 7, 2018

(54) SERIAL FLOW CHANNEL TYPE FILTER CARTRIDGE

(71) Applicants: MICROFILTER CO., LTD., Chungcheongbuk-do (KR); Joung Whi Dong, Seoul (KR)

(72) Inventors: Joung Whi Dong, Seoul (KR); Jaeik Lee, Chungcheongbuk-do (KR); Pilkang Hwang, Chungcheongbuk-do (KR)

(73) Assignees: MICROFILTER CO., LTD., Chungcheongbuk-do (KR); Joung Whi Dong, Seoul (KR)

( * ) Notice: Subject to any disclaimer, the term of this patent is extended or adjusted under 35 U.S.C. 154(b) by 240 days.

(21) Appl. No.: 15/139,834

(22) Filed: Apr. 27, 2016

(65) Prior Publication Data
US 2017/0028320 A1    Feb. 2, 2017

(30) Foreign Application Priority Data
Jul. 29, 2015  (KR) .......................... 10-2015-0107160

(51) Int. Cl.
| | | |
|---|---|---|
| *B01D 27/08* | (2006.01) | |
| *B01D 27/14* | (2006.01) | |
| *C02F 1/00* | (2006.01) | |

(52) U.S. Cl.
CPC .......... *B01D 27/146* (2013.01); *B01D 27/08* (2013.01); *C02F 1/001* (2013.01); *C02F 1/006* (2013.01); *B01D 2201/302* (2013.01); *B01D 2313/105* (2013.01); *B01D 2313/125* (2013.01); *C02F 2201/006* (2013.01); *C02F 2201/007* (2013.01)

(58) Field of Classification Search
None
See application file for complete search history.

(56) References Cited

U.S. PATENT DOCUMENTS

| | | | | |
|---|---|---|---|---|
| 2007/0045165 A1* | 3/2007 | Beall | ................... | B01D 61/025 |
| | | | | 210/321.6 |
| 2010/0326917 A1* | 12/2010 | Park | ..................... | B01D 61/025 |
| | | | | 210/652 |

FOREIGN PATENT DOCUMENTS

KR    10-1999-0021947    3/1999    ........... B01D 35/153

* cited by examiner

*Primary Examiner* — Chester T Barry
(74) *Attorney, Agent, or Firm* — Harness, Dickey & Pierce, P.L.C.

(57) ABSTRACT

A serial flow channel type filter cartridge includes a filter portion which includes a plurality of filter bodies and a plurality of filter housings corresponding to the plurality of filter bodies and independently accommodating the respective filter bodies and a cartridge header in which a top is formed in a structure in which a tap water pipe surrounds a perimeter of a purified water pipe, a plurality of filter accommodating pipes coupled with top ends of the plurality of filter housings which form the filter portion to seal an inside of the filter portion are formed at a bottom, and a serial structure type flow channel which allows tap water to sequentially flow into the plurality of filter accommodating pipes and then allows the water purified while sequentially passing through the plurality of filter bodies to be discharged through the purified water pipe is formed therein.

11 Claims, 21 Drawing Sheets

SERIAL FLOW CHANNEL TYPE FILTER CARTRIDGE

CROSS-REFERENCE TO RELATED APPLICATION

This application claims the benefit of Korean Patent Application No. 2015-0107160, filed on Jul. 29, 2015 in the Korean Intellectual Property Office, the disclosure of which is incorporated herein by reference.

FIELD

The present disclosure relates to a serial flow channel type filter cartridge, and more particularly, to a serial flow channel type filter cartridge which includes a cartridge header with a serial type flow channel capable of using a plurality of filter bodies to improve filterability and to easily maintain and repair a filter.

BACKGROUND

Generally, water purifiers include various filters such as a precipitation filter, a carbon filter, a membrane filter, etc. connected and installed thereinside according to use thereof to allow water to go through a physical or chemical process to be purified while passing through filters.

Filters described above have a structure in which an inlet into which water is injected and an outlet through which water is discharged are formed in a filter head and coupled with connection pipes to be connected with many water purifying filter cartridges to purify and supply water supplied form a water source to a water tank of a water purifier.

FIG. 1 is a configuration diagram of a water purifier which includes a plurality of water purifying filter cartridges installed therein according to a conventional art.

As shown in the drawing, in the conventional water purifier, filter cartridges such as a preprocessing precipitation filter 1, a pre carbon filter 2, a membrane filter 3, a post carbon filter 4, etc. are mounted to be used.

Here, the precipitation filter 1 provides a function of preliminarily filtering foreign substances such as sand, heavy metals, etc. included in water, the pre carbon filter 2 provides a function of adsorbing and removing a chlorine chemical, trihalomethane, organic chemicals, etc. which dissolve in the water, the membrane filter 3 is a core filter of the water purifier and provides a function of finally filtering foreign substances formed of heavy metals, viruses, bacteria, organic chemicals using a reverse osmosis concentration method using a high precision semipermeable membrane, and the post carbon filter 4 provides a function of filtering gas ingredients and odor ingredients which dissolve in the water.

Since the respective filters 1, 2, 3, and 4 which provide various functions described above have different replacement cycles while being used, it is generally necessary to separately replace a filter cartridge from a filter head.

However, maintenance is difficult when filter cartridges are separately replaced for each filter having a different replacement cycle. To solve this, when many filters are replaced at the same time regardless of replacement cycles, maintenance costs are largely increased.

In addition, in the case of conventional filter cartridges, since only one filter cartridge can be mounted on a single filter head, there is a limitation in increasing a purified water amount. Also, since various components for being coupled with the filter head are necessary in addition to a filter body of the filter cartridge, resources are wastefully used.

Accordingly, a technology related to a practical and applicable filter cartridge capable of preventing an unnecessarily wasteful use of resources, reducing maintenance costs, being easily maintained and repaired, and increasing a purified water amount is acutely needed.

Patent Document

Patent Document 1: Korean Patent Registration No. 10-0412929 (published on May 31, 2004)

SUMMARY

Therefore, the present disclosure provides a filter cartridge which includes a cartridge header with a serial type flow channel capable of using a plurality of filter bodies to increase filterability, to easily maintain and repair a filter, and to prevent an unnecessarily wasteful use of resources.

Additional aspects of the present disclosure will be set forth in part in the description which follows and, in part, will be obvious from the description, or may be learned by practice of the present disclosure.

In accordance with one aspect of the present disclosure, a serial flow channel type filter cartridge includes a filter portion which includes a plurality of filter bodies and a plurality of filter housings corresponding to the plurality of filter bodies and independently accommodating the respective filter bodies and a cartridge header in which a top is formed in a structure in which a tap water pipe surrounds a perimeter of a purified water pipe which vertically protrudes, a plurality of filter accommodating pipes coupled with top ends of the plurality of filter housings which form the filter portion to seal an inside of the filter portion are formed at a bottom, and a serial structure type flow channel which allows tap water which flows in through the tap water pipe to sequentially flow into the plurality of filter accommodating pipes and then allows the water purified while sequentially passing through the plurality of filter bodies to be discharged through the purified water pipe is formed therein.

The cartridge header may include a cartridge enlargement unit in which the plurality of filter accommodating pipes which each include a purified water inlet pipe into which the purified water flows from a head of each of the filter bodies are formed on a bottom surface and the tap water which flows in through the tap water pipe and the purified water sequentially passing through the plurality of filter bodies are allowed to move respectively on a top surface, a bypass unit in which a tap water inlet space to which the tap water which flows in through the tap water pipe moves is formed to move the tap water to the cartridge enlargement unit and the purified water pipe vertically protrudes from a central portion of the top surface, and an upper cartridge cover in which the tap water pipe which surrounds the perimeter of the purified water pipe of the bypass unit is formed in a central portion of a top surface.

The cartridge enlargement unit may have a structure in which an outer partition wall which is formed on a top surface and has an integrally connected perimeter and inner partition walls in two or more various shapes to allow transfer paths of the tap water which flows into the plurality of filter bodies and the water purified and discharged therefrom to be mutually different for each filter are formed to allow the tap water which flows in through the tap water pipe and the water purified while sequentially passing through the plurality of filter bodies to move while being not mixed with each other. Here, the bypass unit may have a structure in which an upper step formed of an upwardly protruding an outer perimeter of the top surface is provided on an edge, the tap water inlet space is formed in one direction based on a central portion inside the upper step, an upper partition wall which prevent movement of the tap water which flows in through the tap water pipe is formed in the other direction, and a tap water outlet hole which moves the tap water to the cartridge enlargement unit is formed on an outer perimeter of the tap water inlet space. Also, the upper cartridge cover may have a structure in which a watertight partition wall corresponding to the upper step of the bypass unit and a lower partition wall corresponding to the upper partition wall of the bypass unit are formed on a bottom surface to allow the tap water to move only in one direction based on the top surface of the bypass unit when the tap water flows in through a gap between an outer surface of the purified water pipe and an inner surface of the tap water pipe, and an outer perimeter surrounds and seals the outer partition wall of the cartridge enlargement unit.

The cartridge enlargement unit may include a plurality of purified water outlet portions each formed as a single through hole at a position corresponding to each of the purified water inlet pipes formed in central portions of the plurality of filter accommodating pipes and a plurality of tap water inlet portions each formed as a through hole interposing the most adjacent inner partition wall of each of the plurality of purified water outlet portions therebetween to form a path for the tap water which flows into each of the plurality of filter accommodating pipes. Here, when water is purified while sequentially passing through the plurality of filter accommodating pipes, a first tap water inlet portion corresponding to the path for the tap water which flows in through a first filter accommodating pipe and a last purified water outlet portion corresponding to a path for purified water discharged from a last filter accommodating pipe may each form an independent moving space through which the tap water flows in or the purified water is discharged from the respective filter accommodating pipes by the respective adjacent inner partition walls. Also, other tap water inlet portions except the first tap water inlet portion may each use the same moving space of the purified water outlet portion of a previous filter accommodating pipe. Also, the first tap water inlet portion may be formed at a position corresponding to the tap water outlet hole of the bypass unit and the last purified water outlet portion may be formed at a position corresponding to the purified water pipe of the bypass unit.

The bypass unit may be formed in a structure in which an end of the purified water pipe formed in the central portion of the top surface passes through an end of the tap water pipe formed in the upper cartridge cover, a plurality of partition walls corresponding to the inner partition wall and the outer partition wall formed on the top surface of the cartridge enlargement unit are provided on the bottom surface, and the bottom surface covers and seals overall a top of the cartridge enlargement unit.

Annular sealing members may bee formed at a perimeter of the end of the tap water pipe formed in the upper cartridge cover and a perimeter of the end of the purified water pipe formed in the bypass unit, respectively. Here, a fitting groove may be formed at a perimeter of the tap water pipe to allow the tap water pipe to be nondirectionally coupled with a head portion of a filter assembly to which the filter cartridge is fastened.

The cartridge enlargement unit may have a structure in which two filter accommodating pipes which are adjacently disposed and have circular outer circumferences and linearly connected central portions are formed on the bottom surface, the top surface has a shape in which perimeters of longitudinal edges formed at tops of the two filter accommodating pipes are linearly connected, two purified water outlet portions each formed as a single through hole are formed at positions on the top surface corresponding to central portions of the two filter accommodating pipes, two tap water inlet portions formed as a plurality of through holes in semicircular shapes are formed outside the two purified water outlet portions, two inner partition walls are each formed between the tap water inlet portion and the purified water outlet portion corresponding to each of the two filter accommodating pipes to allow a first purified water outlet portion and a second tap water inlet portion to be connected, and the outer partition wall has a caterpillar structure outside the top surface and surrounds the two purified water outlet portions, the two tap water inlet portions, and the inner partition walls. Here, the bypass unit may totally have a caterpillar structure and a shape corresponding to the outer partition wall and includes a plurality of tap water outlet holes at positions corresponding to the first tap water inlet portion of the cartridge enlargement unit.

The cartridge enlargement unit may have a structure in which three filter accommodating pipes which are sequentially disposed to be adjacent one another and have circular outer circumferences and linearly connected central portions are formed on the bottom surface, the top surface has a shape in which perimeters of longitudinal edges formed at tops of the three filter accommodating pipes are linearly connected, three purified water outlet portions each formed as a single through hole are formed at positions on the top surface corresponding to central portions of the three filter accommodating pipes, first and second tap water inlet portions which have semicircular shapes outside first and second purified water outlet portions disposed on both edges of the three purified water outlet portions and are formed of a plurality of through holes are formed and a third tap water inlet portion corresponding to a third purified water outlet portion is formed of a single through hole, three inner partition walls are each formed between the tap water inlet portion and the purified water outlet portion corresponding to each of the three filter accommodating pipes to allow the first purified water outlet portion to be connected to the second tap water inlet portion and to allow the second purified outlet portion to be connected to the third tap water inlet portion, and the outer partition wall has a caterpillar structure which surrounds overall the three purified water outlet portions, the three tap water inlet portions, and the inner partition wall. Here, the bypass unit may totally have an shape corresponding to the outer partition wall and includes a plurality of tap water outlet holes at positions corresponding to the first tap water inlet portion of the cartridge enlargement unit.

The cartridge enlargement unit may have a structure in which three filter accommodating pipes which are disposed to allow edges to be adjacent to one another and have circular outer circumferences and triangularly connected central portions are formed on the bottom surface, the top surface has a shape in which perimeters of longitudinal edges formed at tops of the three filter accommodating pipes are connected as arcs in a three-leaf shamrock shape, first to third purified water outlet portions each formed as a single through hole are sequentially formed at positions on the top surface corresponding to central portions of the three filter accommodating pipes, first to third tap water inlet portions having semicircular shapes and formed of a plurality of through holes are formed outside the first to third purified water outlet portions, three or more inner partition walls are formed between the tap water inlet portion and the purified water outlet portion corresponding to each of the three filter accommodating pipes to allow the first purified water outlet portion to be connected to the second tap water inlet portion and to allow the second purified water outlet portion to be connected to the third tap water inlet portion counterclockwise, and the outer partition wall surrounds the inner partition wall at a certain interval and totally has a three-leaf shamrock shape. Here, the bypass unit may totally have a three-leaf shamrock shape and an external shape corresponding to the outer partition wall and includes a plurality of tap water outlet holes at positions corresponding to the first tap water inlet portion of the cartridge enlargement unit.

The cartridge enlargement unit may have a structure in which four filter accommodating pipes which are sequentially disposed to be adjacent one another and have circular outer circumferences and linearly connected central portions are formed on the bottom surface, the top surface has a shape in which perimeters of longitudinal edges formed at tops of the four filter accommodating pipes are linearly connected, four purified water outlet portions each formed as a single through hole are formed at positions on the top surface corresponding to central portions of the four filter accommodating pipes, first and fourth tap water inlet portions which have semicircular shapes outside first and fourth purified water outlet portions disposed on both edges of the four purified water outlet portions and are formed of a plurality of through holes are formed and second and third tap water inlet portions corresponding to second and third purified water outlet portions sequentially formed in a central portion are each formed of a single through hole, four inner partition walls are each formed between the tap water inlet portion and the purified water outlet portion corresponding to each of the three filter accommodating pipes to allow the first purified water outlet portion to be connected to the second tap water inlet portion, to allow the second purified outlet portion to be connected to the third tap water inlet portion, and to allow the third purified water outlet portion to be connected to the fourth tap water inlet portion, and the outer partition wall has a caterpillar structure outside the top surface to surround overall the four purified water outlet portions, the four tap water inlet portions, and the inner partition wall. Here, the bypass unit may totally have an shape corresponding to the outer partition wall and includes a plurality of tap water outlet holes at positions corresponding to the first tap water inlet portion of the cartridge enlargement unit.

The cartridge enlargement unit may have a structure in which four filter accommodating pipes which are sequentially disposed to be adjacent to one another and have circular outer circumferences and rectangularly connected central portions are formed on the bottom surface, the top surface has a shape in which perimeters of longitudinal edges formed at tops of the four filter accommodating pipes are connected as arcs in a four-leaf shamrock shape, first to fourth purified water outlet portions each formed as a single through hole are sequentially formed at positions on the top surface corresponding to central portions of the four filter accommodating pipes, first to fourth tap water inlet portions having semicircular shapes and formed of a plurality of through holes are formed outside the first to fourth purified water outlet portions, four or more inner partition walls are formed between the tap water inlet portion and the purified water outlet portion corresponding to each of the four filter accommodating pipes to allow the first purified water outlet portion to be connected to the second tap water inlet portion, to allow the second purified water outlet portion to be connected to the third tap water inlet portion, and to allow the third purified water outlet portion to be connected to the fourth tap water inlet portion counterclockwise, and the outer partition wall surrounds the inner partition wall at a certain interval and totally has a four-leaf shamrock shape. Here, the bypass unit may totally have a four-leaf shamrock shape and an external shape corresponding to the outer partition wall and includes a plurality of tap water outlet holes at positions corresponding to the first tap water inlet portion of the cartridge enlargement unit.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Since embodiments of the present invention are merely examples for structural or functional description, the scope of the present invention will not be limited to the embodiments described herein. That is, since the embodiments may be variously modified and may have various forms, the scope of the present invention will be understood as including equivalents thereof which can embody technical concept thereof.

Meanwhile, the meaning of the terms used herein will be understood as follows.

Since the terms "first", "second", etc. may be used herein to distinguish one component from another, the scope of the present invention should not be limited by these terms. For example, a first component may be referred to as a second component, and similarly, the second component may be referred to as the first component.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components. Meanwhile, other expressions which describe relationships between components, that is, "between" and "directly between" or "adjacent to" and "directly adjacent to" will be also understood similarly thereto.

Singular expressions, unless defined otherwise, should be understood as including plural expressions. It will be understood that the terms "comprise" and/or "have" used herein specify the presence of stated features, numbers, steps, operations, elements, components or combinations thereof but not to preclude the presence or addition of one or more other features, numbers, steps, operations, elements, components, or combinations thereof.

In respective steps, reference symbols, for example, a, b, c, etc. are used for convenience of description. These reference symbols do not indicate an order of the respective steps. The respective steps, unless defined clearly in contexts, may be performed differently from a stated order. That is, the respective steps may be performed identically to the stated order, may be performed substantially at the same time, or may be performed in the reverse order.

All the terms used herein, unless defined otherwise, have the same meaning generally understood by one of ordinary skill in the art. Terms defined in generally used dictionaries should be understood as contextual meanings generally known in the art and, unless defined clearly in the specification, will not be understood as having ideally or excessively formal meanings.

Hereinafter, the embodiments of the present invention will be described in detail with reference to the attached drawings.

Figure 1:
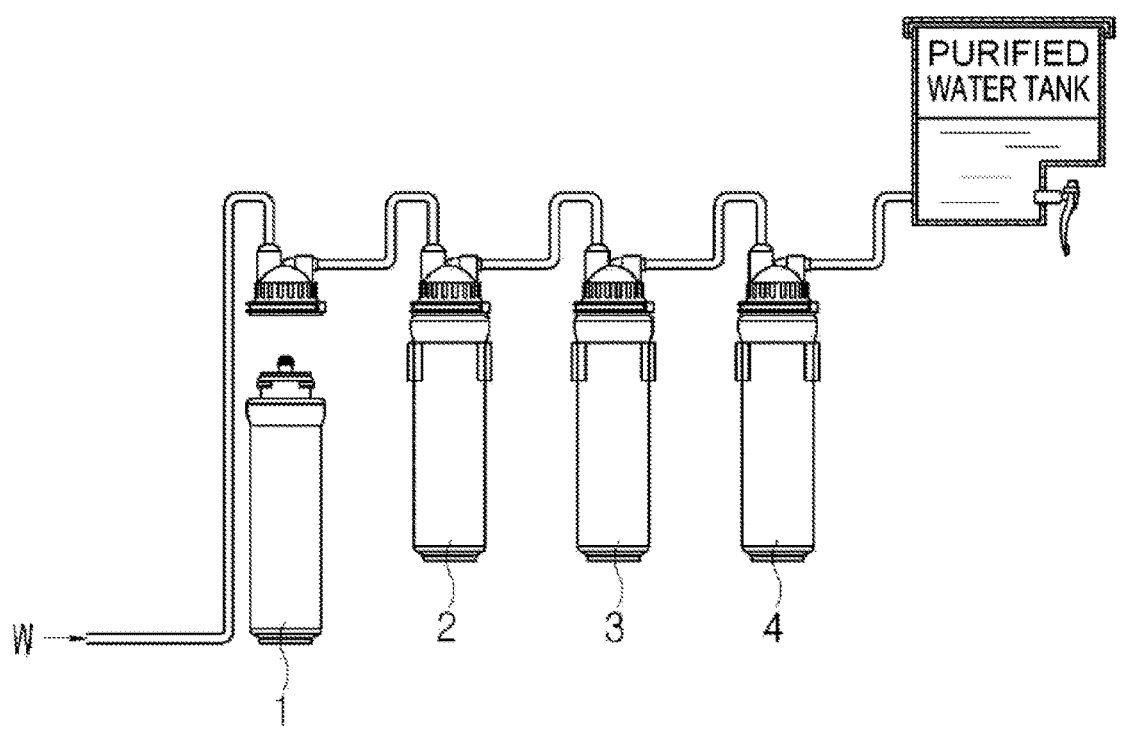
FIG. 1 is a configuration diagram of a water purifier which includes a plurality of water purifying filter cartridges installed therein according to a conventional art.
Figure 2:
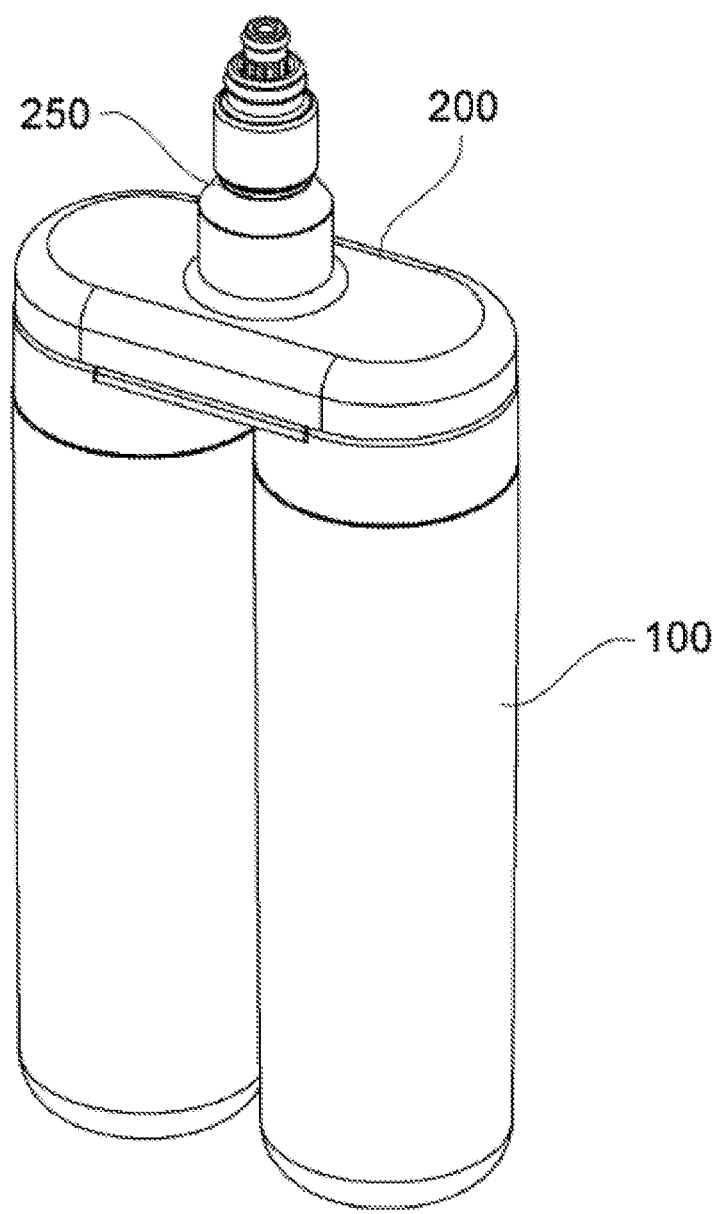
FIGS. 2 and 3 are views of a serial flow channel type filter cartridge including two filter bodies according to a first embodiment of the present invention.
Figure 3:
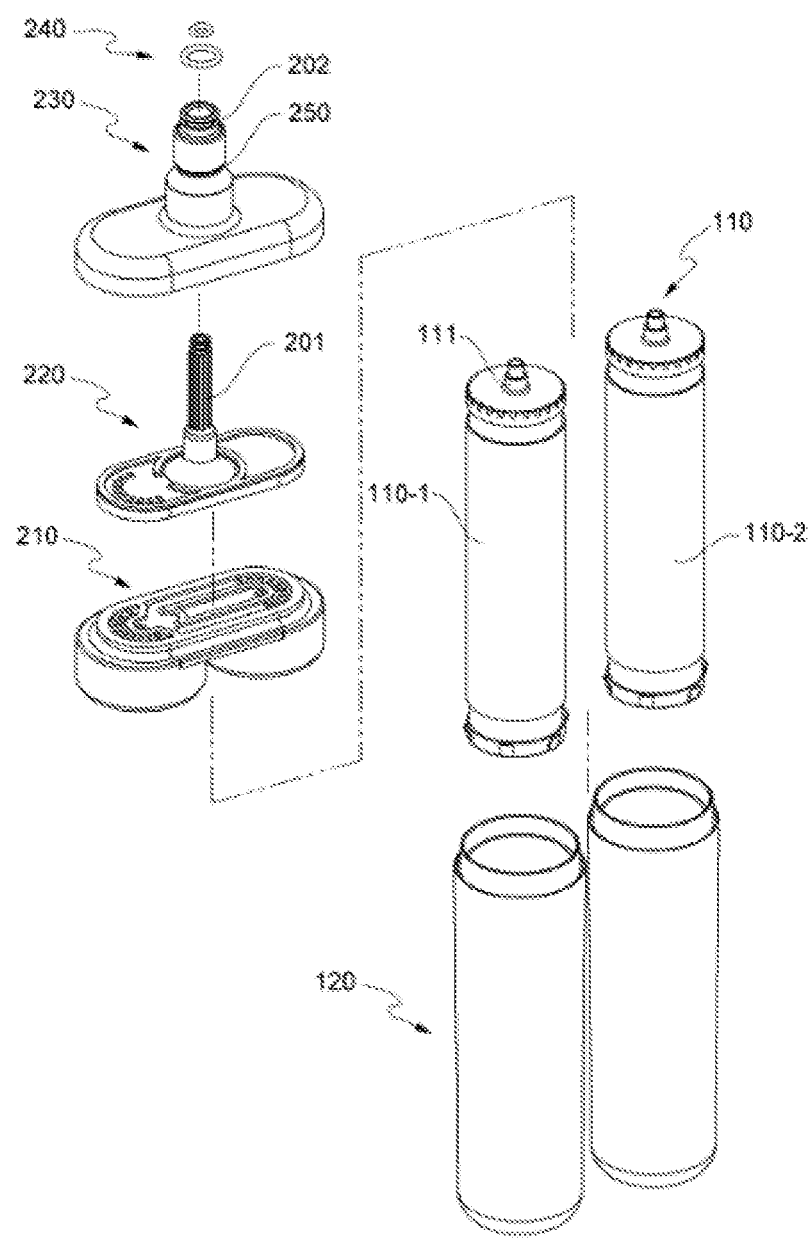

FIGS. 2 and 3 are views of a serial flow channel type filter cartridge including two filter bodies according to a first embodiment of the present invention.

As shown in the drawings, the serial flow channel type filter cartridge according to the first embodiment of the present invention may include a filter portion 100 and a cartridge header 200.

In more detail, the filter portion 100 may include a plurality of filter bodies 110 and a plurality of filter housings 120 corresponding to the plurality of filter bodies 110 and independently accommodating the respective filter bodies 110.

Here, as shown in the drawings, in the serial flow channel type filter cartridge according to the first embodiment of the present invention, even though being separated respectively and corresponding to the respective filter bodies 110 one by one, the plurality of filter housings 120 may be embodied as single housings which each include an inner space which independently accommodate each of the filter bodies 110 corresponding to one another with an integrally formed external case, which will be identically applied to second to fifth embodiments below.

Also, in the cartridge header 200, as shown in the drawings, a top may be formed in a structure in which a single tap water pipe 202 surrounds a perimeter of a single purified water pipe 201 which vertically protrudes and a plurality of filter accommodating pipes 203 respectively coupled with top ends of the plurality of filter housings 120 which form the filter portion 100 to seal an inside of the filter portion 100 may be formed at a bottom.

Here, in the cartridge header 200, a serial structure type flow channel which allows tap water which flows in through the single tap water pipe 202 to sequentially flow into the plurality of filter accommodating pipes 203 and then allows the water purified while sequentially passing through the plurality of filter bodies 110 to be discharged through the single purified water pipe 201 may be formed.

Meanwhile, as shown in the drawings, it may be known that the filter cartridge according to the first embodiment of the present invention includes annular sealing members 240 formed at a perimeter of an end of the single tap water pipe 202 and a perimeter of an end of the single purified water pipe 201 respectively and a circular fitting groove 250 formed at the perimeter of the single tap water pipe 202 to allow the tap water pipe 202 to be nondirectionally coupled with a head portion of a filter assembly to which the filter cartridge is fastened.

Figure 4:
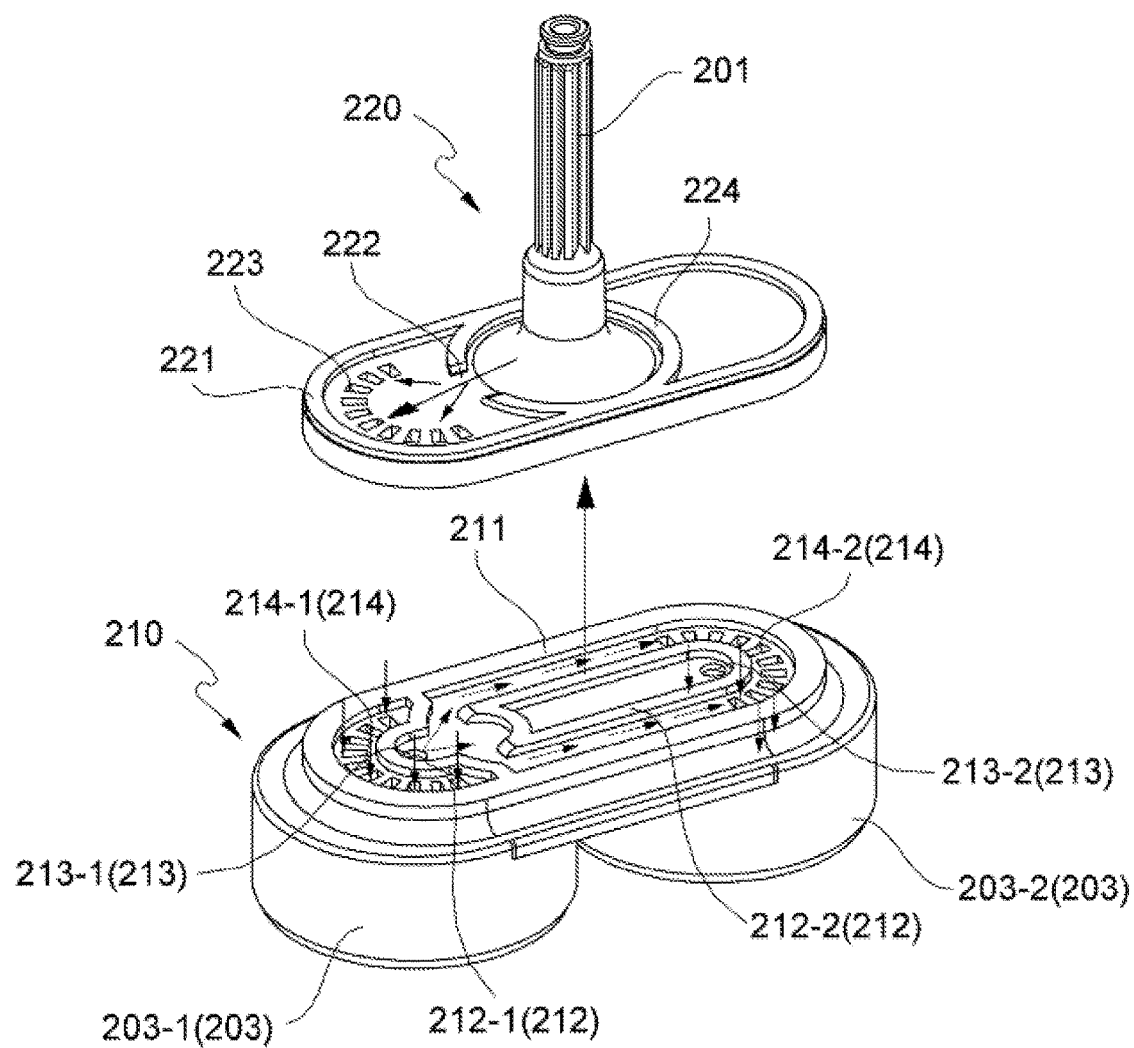
FIGS. 4 and 5 are an exploded view and cross-sectional perspective view of a serial structure type flow channel formed inside a cartridge header according to the first embodiment of the present invention.
Figure 5:
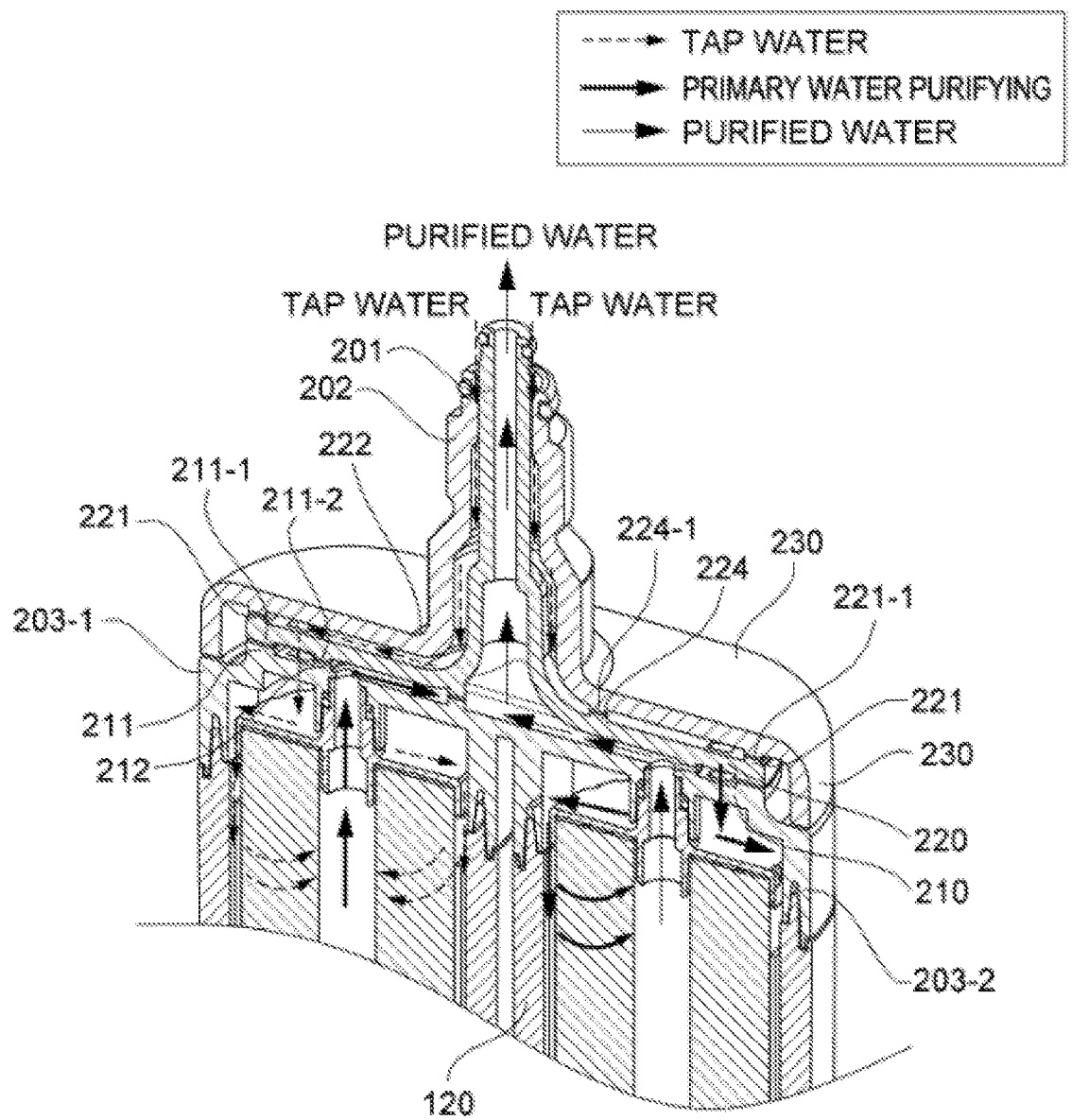

FIGS. 4 and 5 are an exploded view and cross-sectional perspective view of a serial structure type flow channel formed inside the cartridge header according to the first embodiment of the present invention.

Referring to FIGS. 4 and 5, a detailed configuration in the cartridge header 200 for forming the serial structure type flow channel applied to the serial flow channel type filter cartridge according to the first embodiment of the present invention will be described below in detail.

As shown in the drawings, the cartridge header 200 according to the first embodiment of the present invention may include a cartridge enlargement unit 210 and a bypass unit 220.

In the embodiment, the cartridge enlargement unit 210 may include an outer partition wall 211 formed to allow edges of both ends to have semicircular shapes and having an integrally connected perimeter and inner partition walls 212 which have two or more various shapes to allow moving paths for tap water which flows into a plurality of such filter portions 100 and the purified and discharged water to be different for each filter in the outer partition wall 211 on a top surface.

Here, due to the outer partition wall 211 and the inner partition walls 212, the tap water which flows in through the single tap water pipe 202 and the water purified while sequentially passing through the plurality of filter portions 100 may move without being mixed with each other.

Also, the cartridge enlargement unit 210 may include the plurality of filter accommodating pipes 203 which each include a purified water inlet pipe 204 through which the purified water flows in from a head 111 of each of the filter bodies 110 and are formed at a bottom surface.

In more detail, the cartridge enlargement unit 210 may include a plurality of purified water outlet portions 213 each formed as a single through hole at a position corresponding to each of the purified water inlet pipes 204 formed in a central portion of each of the plurality of filter accommodating pipes 203.

Also, the cartridge enlargement unit 210, to form a path for the tap water which flows into each of the plurality of filter accommodating pipes 203, may include a plurality of tap water inlet portions 214 each formed of a through hole interposing the most adjacent inner partition wall 212 of each of the plurality of purified water outlet portions 213 therebetween.

Here, when water is purified while sequentially passing through the plurality of filter accommodating pipes 203, a first tap water inlet portion 214-1 corresponding to a path of tap water which flows into a first filter accommodating pipe 203-1 and a last purified water outlet portion 213-2 corresponding to a path for the purified water discharged from a last filter accommodating pipe 203-2 may each form an independent moving space through which the tap water flows into or the purified water is discharged from each of the filter accommodating pipes 203-1 and 203-2 by each of adjacent inner partition walls 212-1 and 212-2.

Here, as shown in the drawings, another tap water inlet portion 214-2 except the first tap water inlet portion 214-1 may use the same moving space of a purified water outlet portion 213-1 of the previous filter accommodating pipe 203-1.

Also, the first tap water inlet portion 214-1 may be formed at a position corresponding to a tap water outlet hole 223 of the bypass unit 220, which will be described below, and the last purified water outlet portion 213-2 may be formed at a position corresponding to the single purified water pipe 201 of the bypass unit 220.

Meanwhile, in the embodiment, the bypass unit 220 may include an upper step 221 formed of an upwardly protruding outer perimeter of a top surface at an edge to form a tap water inlet space 222 to which the tap water which flows in through the single tap water pipe 202 moves in one direction based on a central portion inside the upper step 221 and an upper partition wall 224 which prevents movement of the tap water which flows in through the single tap water pipe 202 in the other direction based on the central portion inside the upper step 221.

Here, a plurality of such tap water outlet holes 223 which are formed in semicircular shapes and move the tap water to the cartridge enlargement unit 210 may be formed at an outer edge of the tap water inlet space 222 of the upper step 221.

Also, in the bypass unit 220, as shown in the drawings, the single purified water pipe 201 through which the purified water flowing in through the cartridge enlargement unit 210 passes may vertically protrude in a central portion of the tap water inlet space 222.

Also, the bypass unit 220 may be formed as a structure in which the end of the single purified water pipe 201 formed in a central portion of the top surface passes through the end of the single tap water pipe 202 formed at an upper cartridge cover 230 which will be described below.

Also, the bypass unit 220 may include a plurality of partition walls 211-1 and 211-2 formed on a bottom surface, corresponding to the outer partition wall 211 and the inner partition wall 212 formed on the top surface of the cartridge enlargement unit 210, and may be formed in a structure in which the bottom surface covers and seals overall a top of the cartridge enlargement unit 210 as shown in the drawings.

Meanwhile, the serial flow channel type filter cartridge according to the first embodiment of the present invention, as shown in FIG. 3, may include the upper cartridge cover 230 formed having a structure in which the single tap water pipe 202 surrounding the perimeter of the single purified water pipe 201 formed at the bypass unit 220 is formed in a central portion of a top surface, a watertight partition wall 221-1 corresponding to the upper step 221 of the bypass unit 220 and a lower partition wall 224-1 corresponding to the upper partition wall 224 of the bypass unit 220 are formed on a bottom surface, and an outer perimeter of the bottom surface surrounds and seals the outer partition wall 212 of the cartridge enlargement unit 210.

Here, in the case of the serial flow channel type filter cartridge according to the first embodiment of the present invention, when the tap water flows in through a gap between an outer surface of the single purified water pipe 201 and an inner surface of the single tap water pipe 202 due to the upper cartridge cover 230, the tap water may be allowed to move only in one direction based on the top surface of the bypass unit 220 to flow into the cartridge header 200.

Also, referring to FIGS. 4 and 5, in a process of purifying water using the serial type flow channel type filter cartridge according to the first embodiment of the present invention, when the tap water flows in through the single tap water pipe 202 which forms the upper cartridge cover 230, the tap water is allowed to flow only in one direction based on the top surface of the bypass unit 220, thereby flowing into the first tap water inlet portion 214-1 of the cartridge enlargement unit 210 through the tap water inlet space 222 and the tap water outlet holes 223 formed in the bypass unit 220.

Next, the tap water which flows into the first tap water inlet portion 214-1 may pass through a filter body 110-1 coupled with the first filter accommodating pipe 203-1 and then may be discharged through the first purified water outlet portion 213-1 of the cartridge enlargement unit 210 through a first purified water inlet pipe 204-1 of the first filter accommodating pipe 203-1. The water discharged from the first purified water outlet portion 213-1 may flow into the second tap water inlet portion 214-2 of the cartridge enlargement unit 210 which forms the same space due to the inner partition wall 212, may pass a filter body 110-2 coupled with the second filter accommodating pipe 203-2, and then may be discharged from the second purified water outlet portion 213-2 of the cartridge enlargement unit 210 through a second purified water inlet pipe 204-2 of the second filter accommodating pipe 203-2.

The water purified as described above is discharged through the purified water pipe 201 formed in the bypass unit 220 along the moving space formed in a center of the top surface of the cartridge enlargement unit 210 due to the inner partition wall 212 formed in the central portion of the cartridge enlargement unit 210.

That is, to form the water purifying process using the serial flow channel structure described above, the serial flow channel type filter cartridge according to the first embodiment, as described above, may include two filter portions 100 by forming two filter accommodating pipes 203-1 and 203-2 with circular outer circumferences and linearly connected central portions, adjacent to each other, at the bottom surface of the cartridge enlargement unit 210.

Here, the top surface of the cartridge enlargement unit 210 is formed to have a shape in which a longitudinal edge perimeter formed above the two filter accommodating pipes 203-1 and 203-2 is linearly connected to form a horizontal plane for forming a flow channel. The two purified water outlet portions 213-1 and 213-2 each formed as a single through hole may be formed at positions corresponding to central portions of the two filter accommodating pipes 203-1 and 203-2 respectively on the top surface.

Also, the cartridge enlargement unit 210 may form the first and second tap water inlet portions 214-1 and 214-2 each formed of a plurality of through holes to have a semicircular shape outside the inner partition wall 212 adjacent to each of the first and second purified water outlet portions 213-1 and 213-2.

Here, the first purified water outlet portion 213-1 and the second tap water inlet portion 214-2 may be formed to be connected by forming two inner partition walls 212 between the tap water inlet portions 214-1 and 214-2 and the purified water outlet portions 213-1 and 213-2 corresponding to the first and second filter accommodating pipes 203-1 and 203-2, respectively.

Also, according to the first embodiment of the present invention, the outer partition wall 211 may have structure in a caterpillar shape outside the top surface to surround the two purified water outlet portions 213-1 and 213-2, the two tap water inlet portions 214-1 and 214-2, and the inner partition wall 212.

Also, the bypass unit 220 may have a shape corresponding to the outer partition wall 211 which has an outer perimeter in a caterpillar structure and the structure of surrounding the inner partition wall 212.

Here, the bypass unit 220 may include the plurality of tap water outlet holes 223 at a position corresponding to the first tap water inlet portion 214-1 of the cartridge enlargement unit 210.

Figure 6:
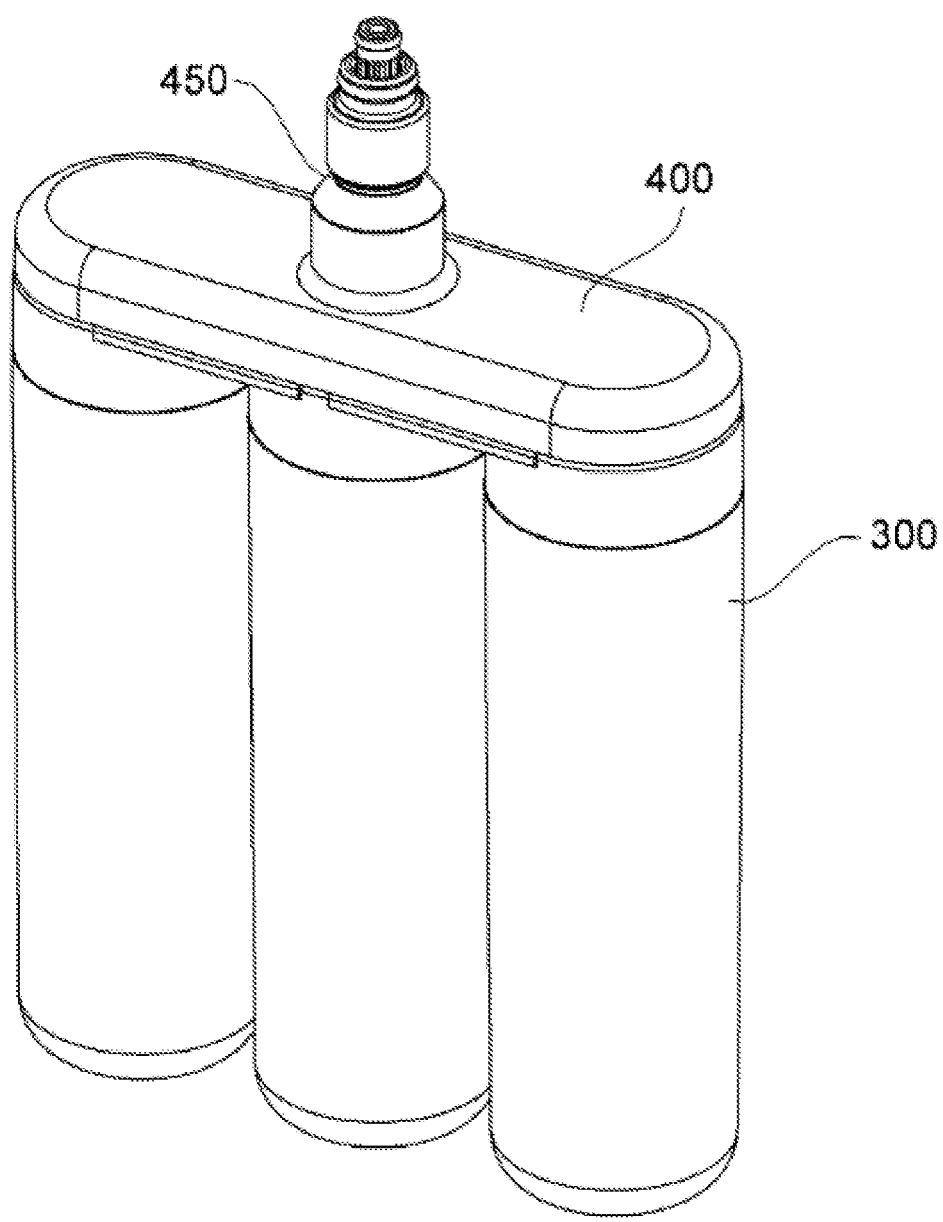
FIGS. 6 and 7 are views of a serial flow channel type filter cartridge including three linearly combined filter bodies according to a second embodiment of the present invention.
Figure 7:
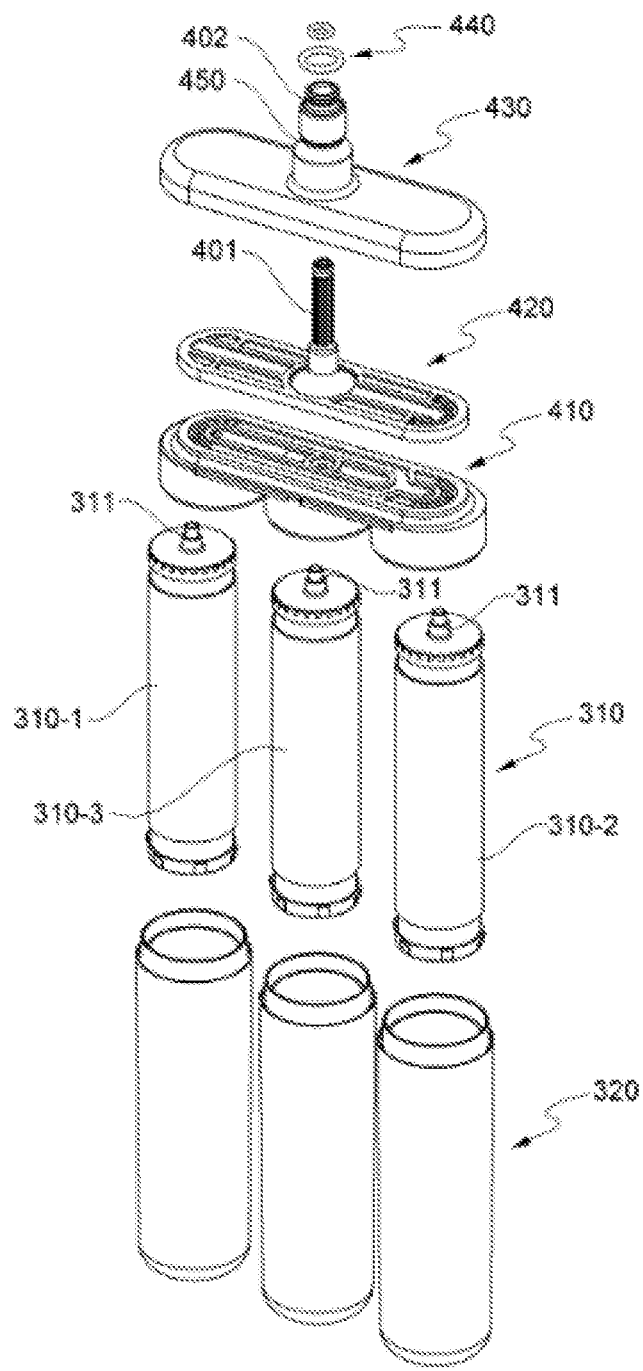

FIGS. 6 and 7 are views of a serial flow channel type filter cartridge including three linearly combined filter bodies according to a second embodiment of the present invention.

As shown in the drawings, the serial flow channel type filter cartridge according to the second embodiment of the present invention may include a filter portion 300 and a cartridge header 400.

In more detail, the filter portion 300 may include a plurality of filter bodies 310 and a plurality of filter housings 320 corresponding to the plurality of filter bodies 310 and independently accommodating the respective filter bodies 310.

Also, in the cartridge header 400, as shown in the drawings, a top may be formed in a structure in which a single tap water pipe 402 surrounds a perimeter of a single purified water pipe 401 which vertically protrudes and a plurality of filter accommodating pipes 403 respectively coupled with top ends of the plurality of filter housings 320 which form the filter portion 300 to seal an inside of the filter portion 300 may be formed at a bottom.

Here, in the cartridge header 400, a serial structure type flow channel which allows tap water which flows in through the single tap water pipe 402 to sequentially flow into the plurality of filter accommodating pipes 403 and then allows the water purified while sequentially passing through the plurality of filter bodies 310 to be discharged through the single purified water pipe 401 may be formed.

Meanwhile, as shown in the drawings, it may be known that the filter cartridge according to the second embodiment of the present invention includes annular sealing members 440 formed at a perimeter of an end of the single tap water pipe 402 and a perimeter of an end of the single purified water pipe 401 respectively and a circular fitting groove 450 formed at the perimeter of the single tap water pipe 402, thereby allowing the single tap water pipe 402 to be coupled with a head portion of a filter assembly to which the filter cartridge is fastened.

Figure 8:
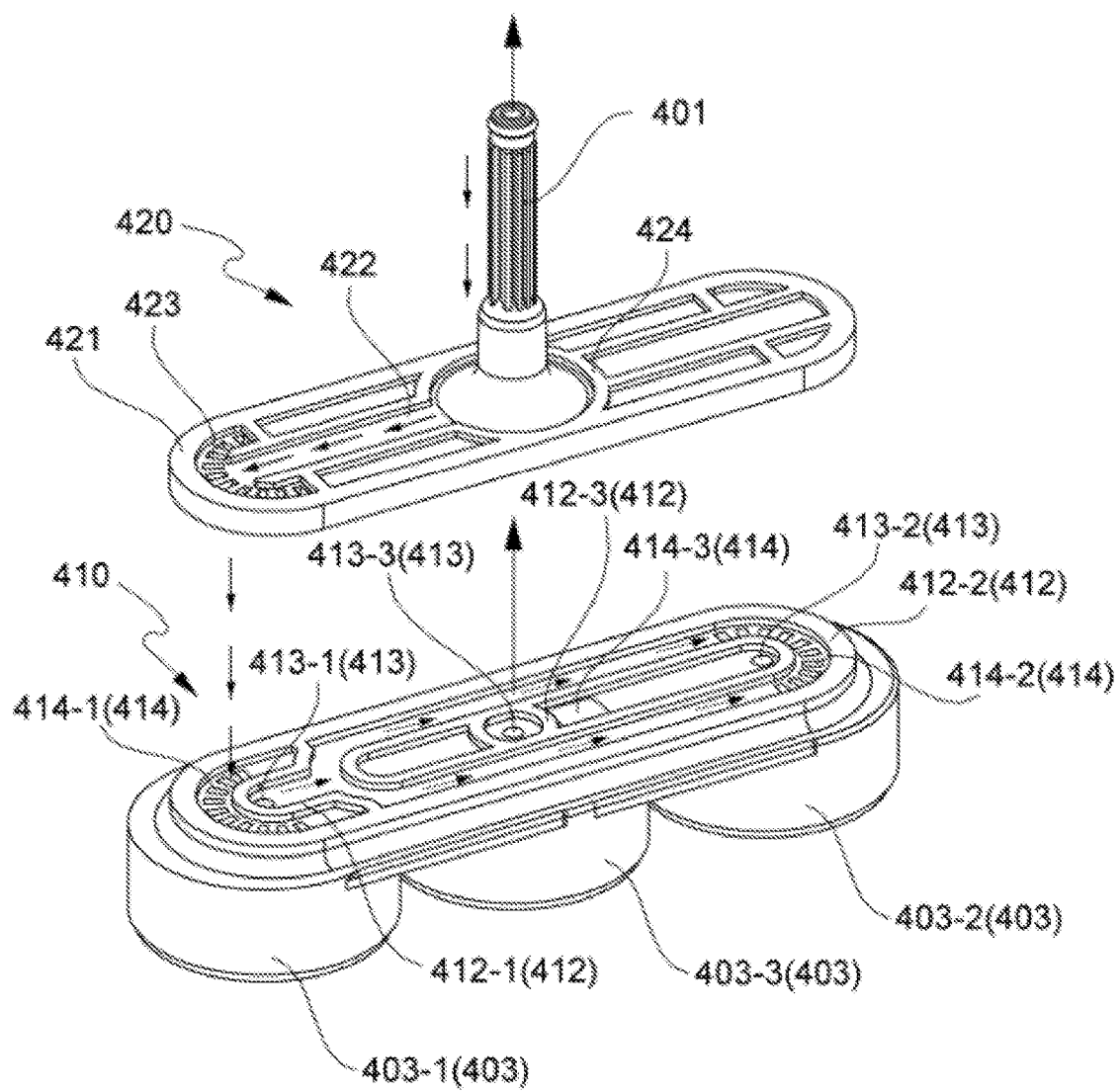
FIGS. 8 and 9 are an exploded view and cross-sectional perspective view of a serial structure type flow channel formed inside a cartridge header according to the second embodiment of the present invention.
Figure 9:
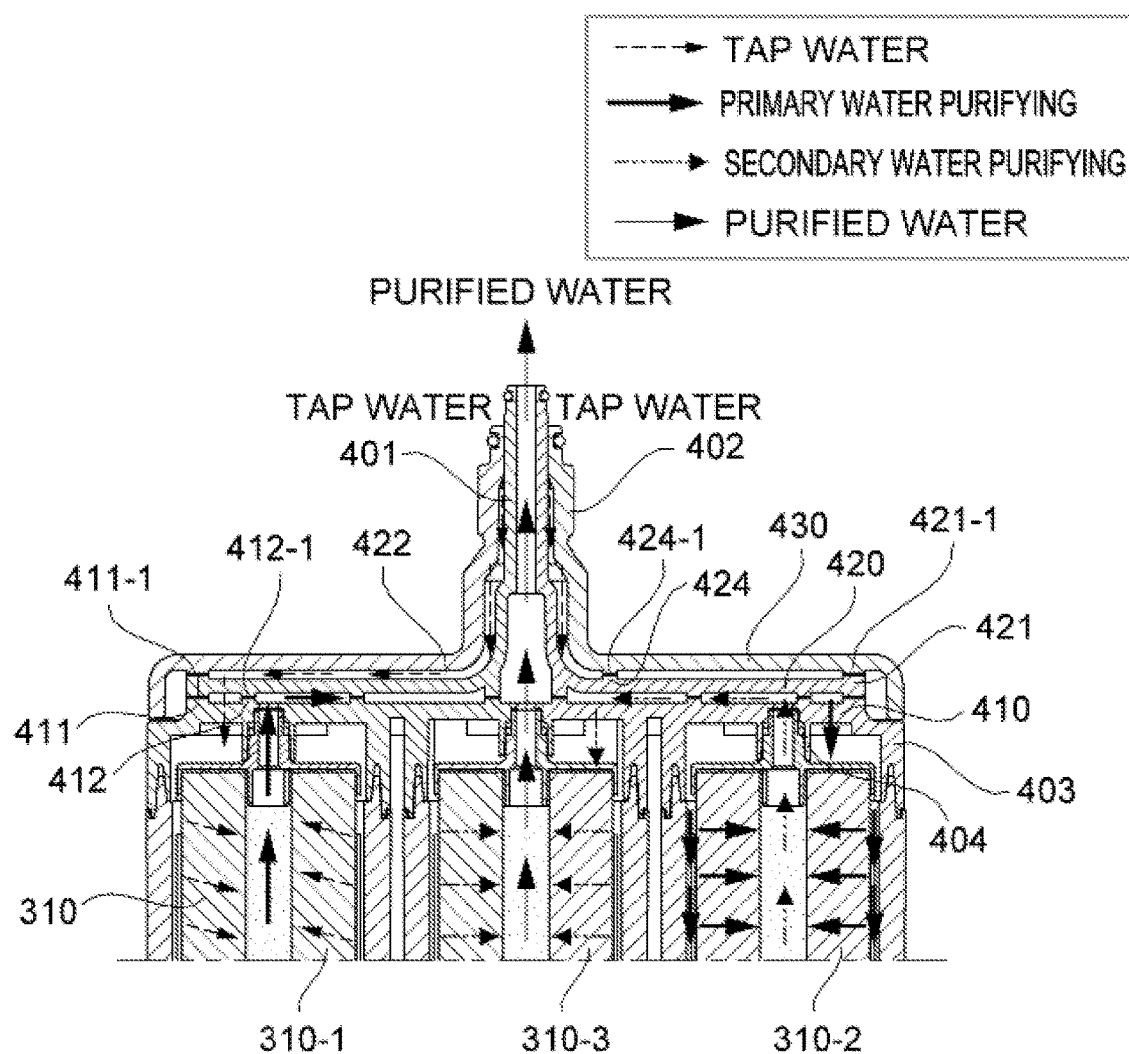

FIGS. 8 and 9 are an exploded view and a cross-sectional perspective view of the serial structure type flow channel formed inside the cartridge header according to the second embodiment of the present invention.

Referring to FIGS. 8 and 9, a detailed configuration in the cartridge header 400 for forming the serial structure type flow channel applied to the serial flow channel type filter cartridge according to the second embodiment of the present invention will be described below in detail.

As shown in the drawings, the cartridge header 400 according to the second embodiment of the present invention may include a cartridge enlargement unit 410 and a bypass unit 420.

In the embodiment, the cartridge enlargement unit 410 may include an outer partition wall 411 formed to allow edges of both ends to have semicircular shapes and having an integrally connected perimeter and inner partition walls 412 which have two or more various shapes to allow moving paths for tap water which flows into a plurality of such filter portions 300 and the purified and discharged water to be different for each filter in the outer partition wall 411 on a top surface.

Here, due to the outer partition wall 411 and the inner partition walls 412, the tap water which flows in through the single tap water pipe 402 and the water purified while sequentially passing through the plurality of filter portions 300 may move without being mixed with each other.

Also, the cartridge enlargement unit 410 may include the plurality of filter accommodating pipes 403 which each include a purified water inlet pipe 404 through which the purified water flows in from a head 311 of each of the filter bodies 310 and are formed at a bottom surface.

In more detail, the cartridge enlargement unit 410 may include a plurality of purified water outlet portions 413 each formed as a single through hole at a position corresponding to each of the purified water inlet pipes 404 formed in a central portion of each of the plurality of filter accommodating pipes 403.

Also, the cartridge enlargement unit 410, to form a path for the tap water which flows into each of the plurality of filter accommodating pipes 403, may include a plurality of tap water inlet portions 414 each formed of a through hole interposing the most adjacent inner partition wall 412 of each of the plurality of purified water outlet portions 413 therebetween.

Here, when water is purified while sequentially passing through the plurality of filter accommodating pipes 403, a first tap water inlet portion 414-1 corresponding to a path of tap water which flows into a first filter accommodating pipe 403-1 and a last purified water outlet portion 413-3 corresponding to a path for the purified water discharged from a last filter accommodating pipe 403-3 may each form an independent moving space through which the tap water flows into or the purified water is discharged from each of the filter accommodating pipes 403-1 and 403-3 by each of adjacent inner partition walls 412-1 and 412-3.

Here, as shown in the drawings, other tap water inlet portions 414-2 and 414-3 except the first tap water inlet portion 414-1 may use the same moving space of purified water outlet portions 413-1 and 413-2 of previous filter accommodating pipes 403-1 and 403-2.

Also, the first tap water inlet portion 414-1 may be formed at a position corresponding to a tap water outlet hole 423 of the bypass unit 420, which will be described below, and the last purified water outlet portion 413-3 may be formed at a position corresponding to the single purified water pipe 401 of the bypass unit 420.

Also, as shown in the drawings, it may be known that the plurality of tap water inlet portions 414-1 and 414-2 formed inside edges of both ends of the outer partition wall 411 are formed in semicircular shapes.

Meanwhile, in the embodiment, the bypass unit 420 may include an upper step 421 formed of an upwardly protruding outer perimeter of a top surface at an edge to form a tap water inlet space 422 to which the tap water which flows in through the single tap water pipe 402 moves in one direction based on a central portion inside the upper step 421 and an upper partition wall 424 which prevents movement of the tap water which flows in through the single tap water pipe 402 in the other direction based on the central portion inside the upper step 421.

Here, a plurality of such tap water outlet holes 423 which are formed in semicircular shapes and move the tap water to the cartridge enlargement unit 410 may be formed at an outer edge of the tap water inlet space 422 of the upper step 421.

Also, in the bypass unit 420, as shown in the drawings, the single purified water pipe 401 through which the purified water flowing in through the cartridge enlargement unit 410 passes may vertically protrude in a central portion of the tap water inlet space 422.

Also, the bypass unit 420 may be formed in a structure in which the end of the single purified water pipe 401 formed in a central portion of the top surface passes through the end of the single tap water pipe 402 formed at an upper cartridge cover 430 which will be described below.

Also, the bypass unit 420 may include a plurality of partition walls 411-1 and 411-2 formed on a bottom surface, corresponding to the outer partition wall 411 and the inner partition wall 412 formed on the top surface of the cartridge enlargement unit 410, and may be formed in a structure in which the bottom surface covers and seals overall a top of the cartridge enlargement unit 210 as shown in the drawings.

Meanwhile, the serial flow channel type filter cartridge according to the second embodiment of the present invention, as shown in FIG. 7, may include the upper cartridge cover 430 formed having a structure in which the single tap water pipe 402 surrounding the perimeter of the single purified water pipe 401 formed at the bypass unit 420 is formed in a central portion of a top surface, a watertight partition wall 421-1 corresponding to the upper step 421 of the bypass unit 420 and a lower partition wall 424-1 corresponding to the upper partition wall 424 of the bypass unit 420 are formed on a bottom surface, and an outer perimeter of the bottom surface surrounds and seals the outer partition wall 411 of the cartridge enlargement unit 410.

Here, in the case of the serial flow channel type filter cartridge according to the second embodiment of the present invention, when the tap water flows in through a gap between an outer surface of the single purified water pipe 401 and an inner surface of the single tap water pipe 402 due to the upper cartridge cover 430, the tap water may be allowed to move only in one direction based on the top surface of the bypass unit 420 to flow into the cartridge header 400.

Also, referring to FIGS. 8 and 9, in a process of purifying water using the serial type flow channel type filter cartridge according to the second embodiment of the present invention, when the tap water flows in through the single tap water pipe 402 which forms the upper cartridge cover 430, the tap water is allowed to flow only in one direction based on the top surface of the bypass unit 420, thereby flowing into the first tap water inlet portion 414-1 of the cartridge enlargement unit 410 through the tap water inlet space 422 and the tap water outlet holes 423 formed in the bypass unit 420.

Next, the tap water which flows into the first tap water inlet portion 414-1 may pass through a first filter body 310-1 coupled with the first filter accommodating pipe 403-1 and then may be discharged through the first purified water outlet portion 413-1 of the cartridge enlargement unit 410 through a first purified water inlet pipe 404-1 of the first filter accommodating pipe 403-1. The water discharged from the first purified water outlet portion 413-1 may flow into the second tap water inlet portion 414-2 of the cartridge enlargement unit 410 which forms the same space due to the inner partition wall 412, may pass a second filter body 310-2 coupled with the second filter accommodating pipe 403-2, and then may be discharged from the second purified water outlet portion 413-2 of the cartridge enlargement unit 410 through a second purified water inlet pipe 404-2 of the second filter accommodating pipe 403-2.

Next, the tap water which flows into the third tap water inlet portion 414-3 passes through a third filter body 310-3 coupled with the third filter accommodating pipe 403-3 and then is discharged through the third purified water outlet portion 413-3 of the cartridge enlargement unit 410 through a third purified water inlet pipe 404-3 of the third filter accommodating pipe 403-3. The water purified as described above is discharged through the purified water pipe 401 formed in the bypass unit 420 along a moving space formed in a center of the top surface of the cartridge enlargement unit 410 by the inner partition wall 412 formed in the central portion of the cartridge enlargement unit 410.

That is, to form the water purifying process using the serial flow channel structure described above, the serial flow channel type filter cartridge according to the second embodiment, as described above, may include three filter portions 300 provided by sequentially forming and adjacently disposing three filter accommodating pipes 403-1, 403-2, and 403-3 with circular outer circumferences and linearly connected central portions at the bottom surface of the cartridge enlargement unit 400.

Here, the top surface of the cartridge enlargement unit 410 is formed to have a shape in which a longitudinal edge perimeter formed above the first to third filter accommodating pipes 403-1, 403-2, and 403-3 is linearly connected to form a horizontal plane for forming a flow channel. The first to third purified water outlet portions 413-1 413-2, and 413-3 each formed as a single through hole may be formed at positions corresponding to central portions of the first to third filter accommodating pipes 403-1, 403-2, and 403-3 on the top surface, respectively.

Also, the cartridge enlargement unit 410 may include the first and second tap water inlet portions 414-1 and 414-2 formed of a plurality of through holes to have semicircular shapes outside the inner partition wall 412 adjacent to the first and second purified outlet portions 413-1 and 413-2 and may form the third tap water inlet portion 414-3 formed of a single through hole having a rectangular shape outside the inner partition wall 412 adjacent to the third purified water outlet portion 413-3 formed in the central portion.

Here, the first purified water outlet portion 413-1 and the second tap water inlet portion 414-2 and the second purified water outlet portion 413-2 and the third tap water inlet portion 414-3 may be connected to one another by forming three inner partition walls 412 between the tap water inlet portions 414-1, 414-2, and 414-3 and the purified water outlet portions 413-1, 413-2, and 413-3 corresponding to the first to third filter accommodating pipes 403-1, 403-2, and 403-3, respectively.

Also, in the cartridge enlargement unit 410, the outer partition wall 411 which integrally surrounds the first to third purified water outlet portions 413-1, 413-2, and 413-3 and totally has a caterpillar structure when viewed from above may be formed on the top surface. The outer partition wall 411 may be formed in a structure which surrounds the three purified water outlet portions 413-1, 413-2, and 413-3, the three tap water inlet portions 414-1, 414-2, and 414-3, and the inner partition wall 412.

Meanwhile, according to the embodiment, in the cartridge enlargement unit 410, the three tap water inlet portions 414 which have a semicircular shape and a rectangular shape may be formed between the outer partition wall 411 and the inner partition wall 412.

Also, the bypass unit 420 may have a shape corresponding to the outer partition wall 411 which has an outer perimeter in a totally caterpillar structure and a structure of surrounding the inner partition wall 412.

Here, the bypass unit 420 may include the plurality of tap water outlet holes 423 at a position corresponding to the first tap water inlet portion 414-1 of the cartridge enlargement unit 410.

Figure 10:
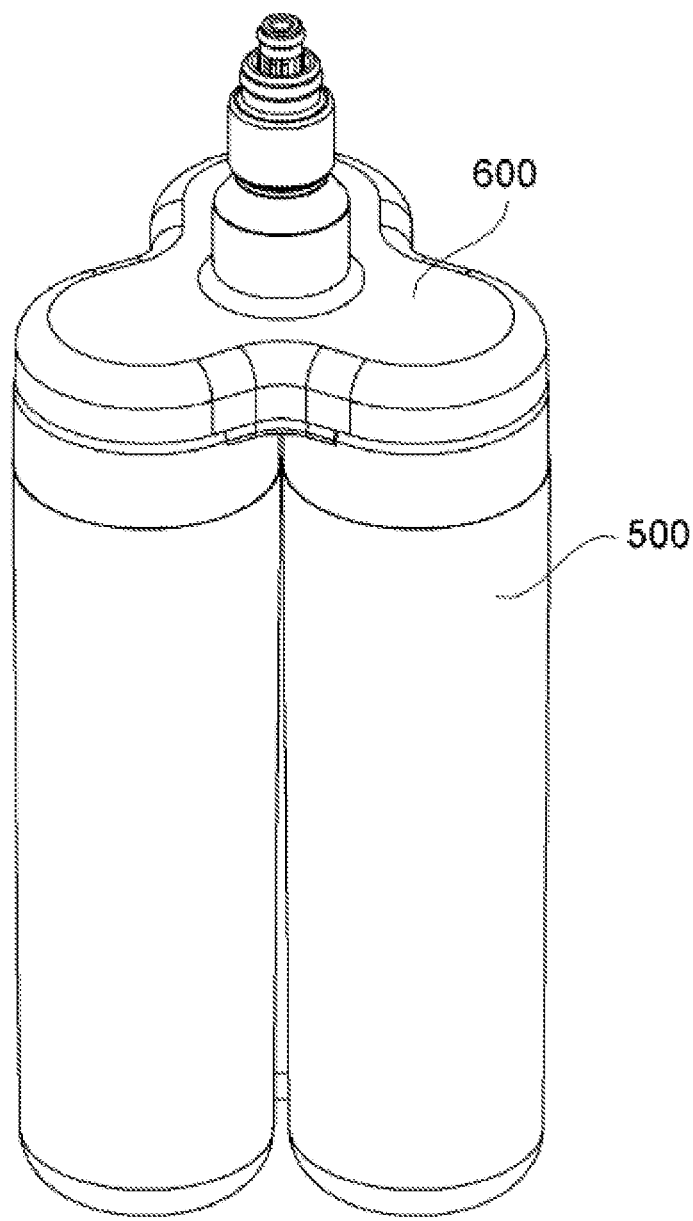
FIGS. 10 and 11 are views of a serial flow channel type filter cartridge including three triangularly combined filter bodies according to a third embodiment of the present invention.
Figure 11:
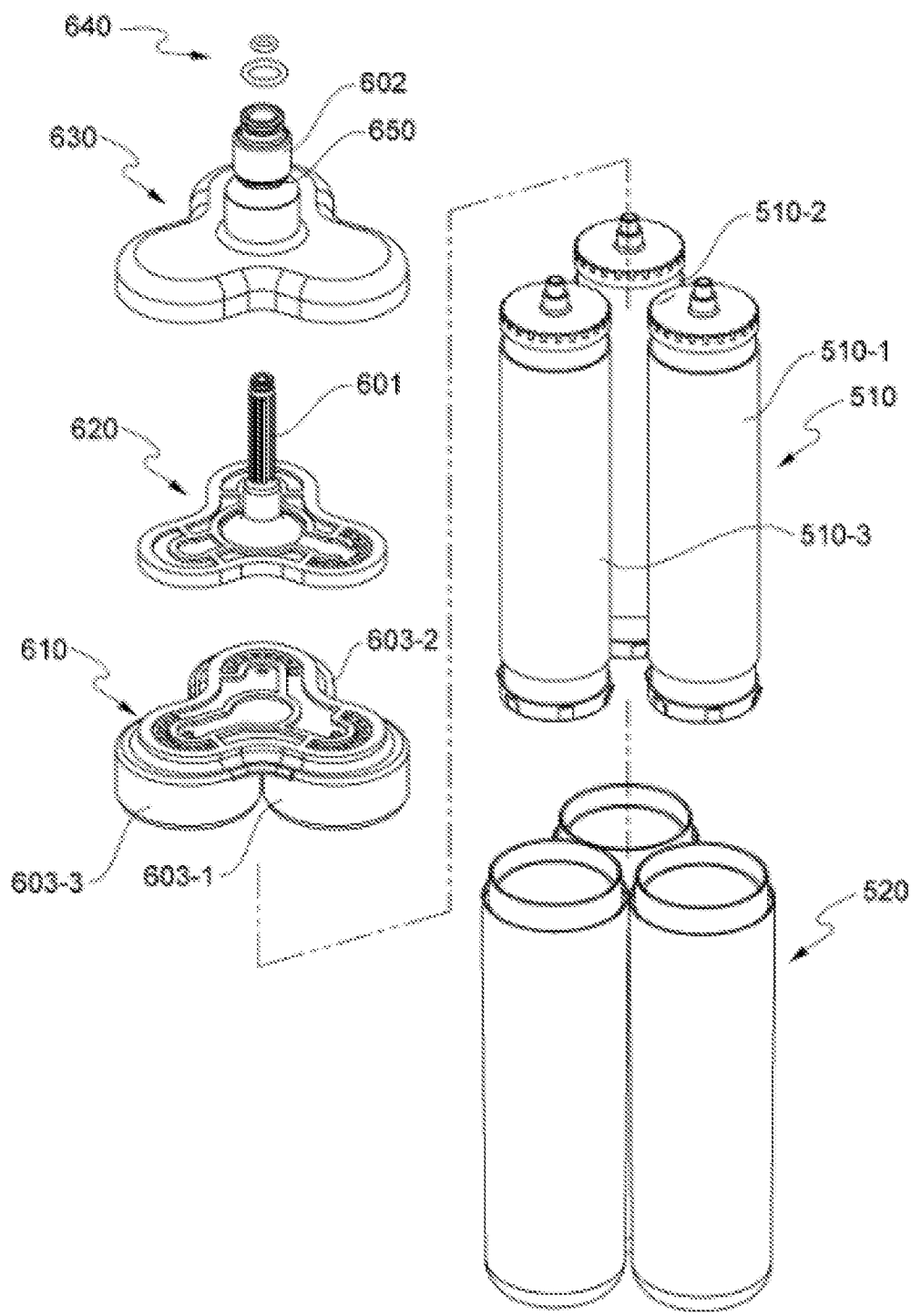

FIGS. 10 and 11 are views of a serial flow channel type filter cartridge including three triangularly combined filter bodies according to a third embodiment of the present invention.

As shown in the drawings, the serial flow channel type filter cartridge according to the third embodiment of the present invention may include a filter portion 500 and a cartridge header 600.

In more detail, the filter portion 500 may include a plurality of filter bodies 510 and a plurality of filter housings 520 corresponding to the plurality of filter bodies 510 and independently accommodating the respective filter bodies 510.

Also, in the cartridge header 600, as shown in the drawings, a top may be formed in a structure in which a single tap water pipe 602 surrounds a perimeter of a single purified water pipe 601 which vertically protrudes and a plurality of filter accommodating pipes 603 respectively coupled with top ends of the plurality of filter housings 520 which form the filter portion 500 to seal an inside of the filter portion 500 may be formed at a bottom.

Here, in the cartridge header 600, a serial structure type flow channel which allows tap water which flows in through the single tap water pipe 602 to sequentially flow into the plurality of filter accommodating pipes 603 and then allows the water purified while sequentially passing through the plurality of filter bodies 510 to be discharged through the single purified water pipe 601 may be formed.

Meanwhile, as shown in the drawings, it may be known that the filter cartridge according to the third embodiment of the present invention includes annular sealing members 640 formed at a perimeter of an end of the single tap water pipe 602 and a perimeter of an end of the single purified water pipe 601 and a circular fitting groove 650 formed at the perimeter of the single tap water pipe 602 to allow the tap water pipe 602 to be nondirectionally coupled with a head portion of a filter assembly to which the filter cartridge is fastened.

Figure 12:
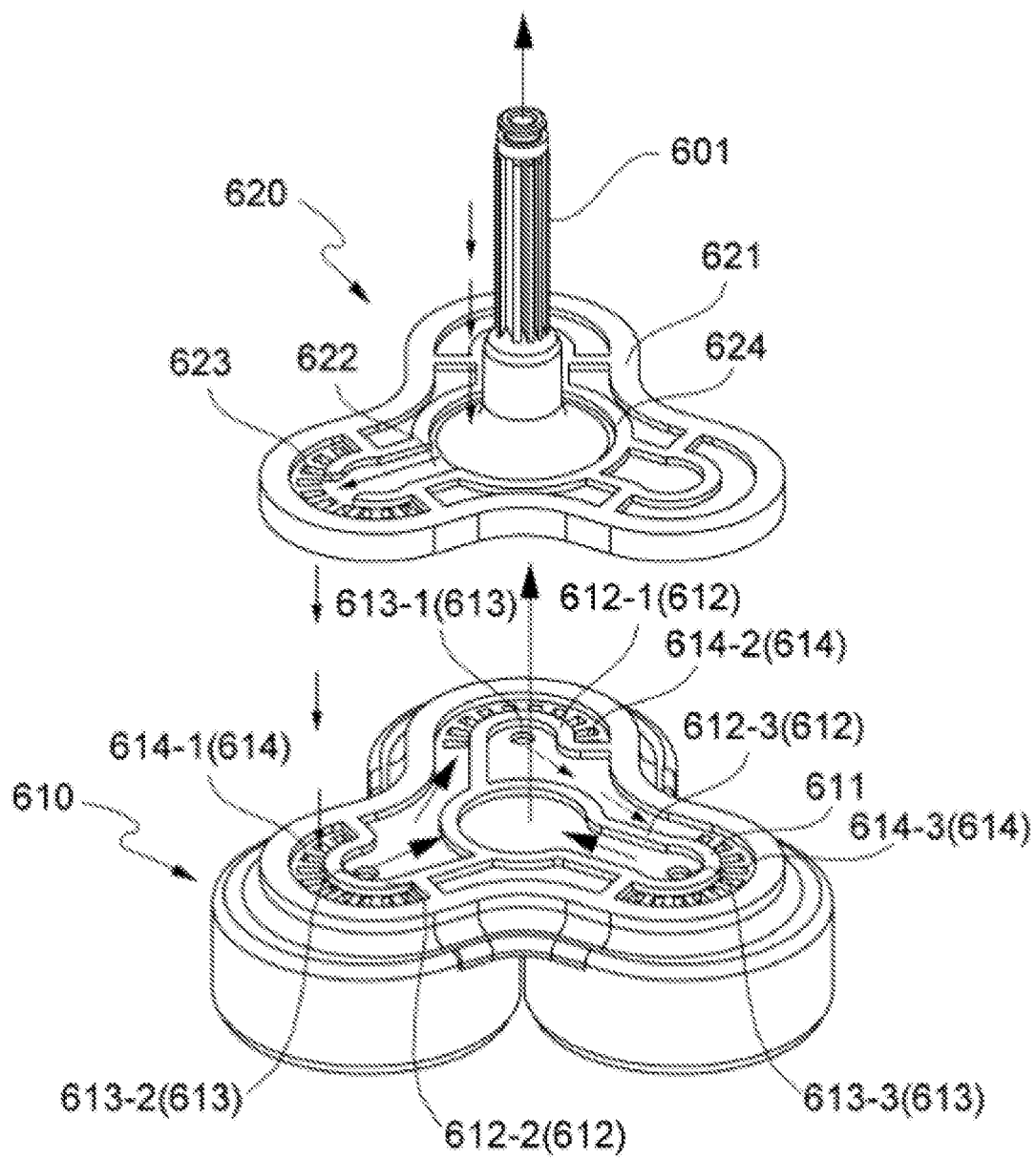
FIGS. 12 and 13 are an exploded view and cross-sectional perspective view of a serial structure type flow channel formed inside a cartridge header according to the third embodiment of the present invention.
Figure 13:
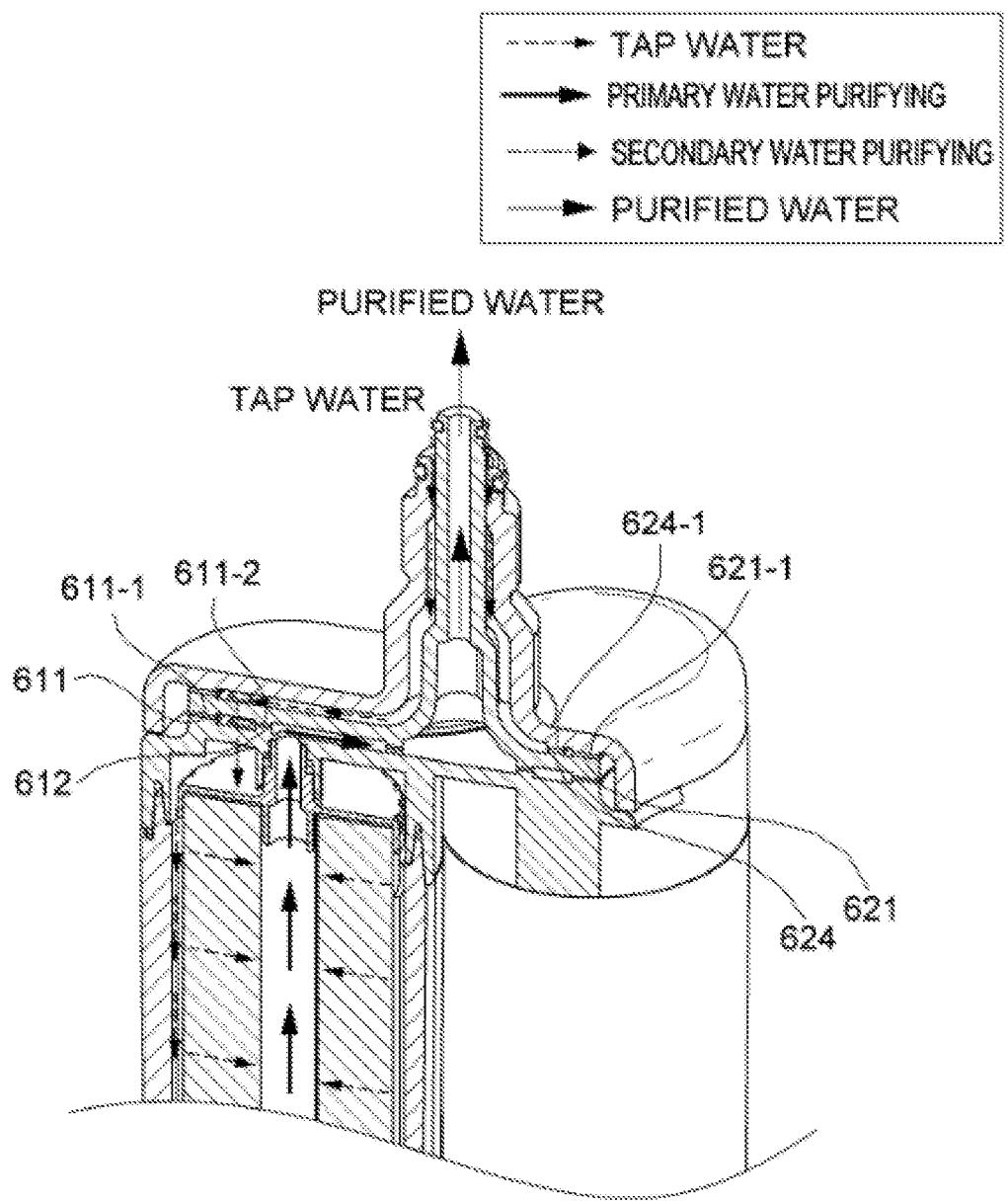

FIGS. 12 and 13 are an exploded view and a cross-sectional perspective view of a serial structure type flow channel formed inside the cartridge header according to the third embodiment of the present invention.

Referring to FIGS. 12 and 13, a detailed configuration in the cartridge header 600 for forming the serial structure type flow channel applied to the triangular filter cartridge according to the third embodiment of the present invention will be described below in detail.

As shown in the drawings, the cartridge header 600 according to the third embodiment of the present invention may include a cartridge enlargement unit 610 and a bypass unit 620.

In the embodiment, the cartridge enlargement unit 610 may include an outer partition wall 611 formed to allow an edge with a semicircular shape and having an integrally connected perimeter to have a three-leaf shamrock shape and inner partition walls 612 which have two or more various shapes to allow moving paths for tap water which flows into a plurality of such filter portions 500 and the purified and discharged water to be different for each filter inside the outer partition wall 411 on a top surface.

Here, due to the outer partition wall 611 and the inner partition walls 612, the tap water which flows in through the single tap water pipe 602 and the water purified while sequentially passing through the plurality of filter portions 500 may move without being mixed with each other.

Also, the cartridge enlargement unit 610 may include the plurality of filter accommodating pipes 603 which each include a purified water inlet pipe 604 through which the purified water flows in from a head 511 of each of the filter bodies 510 and are formed at a bottom surface.

In more detail, the cartridge enlargement unit 610 may include a plurality of purified water outlet portions 613 each formed as a single through hole at a position corresponding to each of the purified water inlet pipes 604 formed in a central portion of each of the plurality of filter accommodating pipes 603.

Also, the cartridge enlargement unit 610, to form a path for the tap water which flows into each of the plurality of filter accommodating pipes 603, may include a plurality of tap water inlet portions 614 each formed of a through hole interposing the most adjacent inner partition wall 612 of each of the plurality of purified water outlet portions 613 therebetween.

Here, when water is purified while sequentially passing through the plurality of filter accommodating pipes 603, a first tap water inlet portion corresponding to a path of tap water which flows into a first filter accommodating pipe 603-1 and a last purified water outlet portion 613-3 corresponding to a path for the purified water discharged from a last filter accommodating pipe 603-3 may each form an independent moving space through which the tap water flows into or the purified water is discharged from each of the filter accommodating pipes 603-1 and 603-3 by each of adjacent inner partition walls 612-1 and 612-3.

Here, as shown in the drawings, other tap water inlet portions 614-2 and 614-3 except the first tap water inlet portion 614-1 may use the same moving space of purified water outlet portions 613-1 and 613-2 of previous filter accommodating pipes 603-1 and 603-2.

Also, the first tap water inlet portion 614-1 may be formed at a position corresponding to a tap water outlet hole 623 of the bypass unit 620, which will be described below, and the last purified water outlet portion 613-3 may be formed at a position corresponding to the single purified water pipe 601 of the bypass unit 620.

Also, as shown in the drawings, the plurality of tap water inlet portions 614-1, 614-2, and 614-3 are provided in semicircular shapes inside the edge for forming the three-leaf shamrock shape of the outer partition wall 611.

Meanwhile, in the embodiment, the bypass unit 620 may include an upper step 621 formed of an upwardly protruding outer perimeter of a top surface at an edge to form a tap water inlet space 622 to which the tap water which flows in through the single tap water pipe 402 moves in one direction based on a central portion inside the upper step 621 and an upper partition wall 624 which prevents movement of the tap water which flows in through the single tap water pipe 602 in the other direction based on the central portion inside the upper step 421.

Here, a plurality of such tap water outlet holes 623 which are formed in semicircular shapes and move the tap water to the cartridge enlargement unit 610 may be formed at an outer edge of the tap water inlet space 622 of the upper step 621.

Also, in the bypass unit 620, as shown in the drawings, the single purified water pipe 601 through which the purified water flowing in through the cartridge enlargement unit 610 passes may vertically protrude in a central portion of the tap water inlet space 622.

Also, the bypass unit 620 may be formed in a structure in which the end of the single purified water pipe 601 formed in a central portion of the top surface passes through the end of the single tap water pipe 602 formed at an upper cartridge cover 630 which will be described below.

Also, the bypass unit 620 may include the inner partition wall 612 formed on the top surface of the cartridge enlargement unit 610 and a plurality of partition walls 611-1 and 611-2 formed on a bottom surface corresponding to the inner partition wall 612 and may be formed as a structure in which the bottom surface covers and seals overall a top of the cartridge enlargement unit 610 as shown in the drawings.

Meanwhile, the serial flow channel type filter cartridge according to the third embodiment of the present invention, as shown in FIG. 11, may include the upper cartridge cover 630 formed having a structure in which the single tap water pipe 602 surrounding the perimeter of the single purified water pipe 601 formed at the bypass unit 620 is formed in a central portion of a top surface, a watertight partition wall 621-1 corresponding to the upper step 621 of the bypass unit 620 and a lower partition wall 624-1 corresponding to the upper partition wall 624 of the bypass unit 620 are formed on a bottom surface, and an outer perimeter of the bottom surface surrounds and seals the outer partition wall 611 of the cartridge enlargement unit 610.

Here, in the case of the serial flow channel type filter cartridge according to the third embodiment of the present invention, when the tap water flows in through a gap between an outer surface of the single purified water pipe 601 and an inner surface of the single tap water pipe 602 due to the upper cartridge cover 630, the tap water may be allowed to move only in one direction based on the top surface of the bypass unit 620 to flow into the cartridge header 600.

Also, referring to FIGS. 12 and 13, in a process of purifying water using the serial type flow channel type filter cartridge according to the third embodiment of the present invention, when the tap water flows in through the single tap water pipe 602 which forms the upper cartridge cover 630, the tap water is allowed to flow only in one direction based on the top surface of the bypass unit 620, thereby flowing into the first tap water inlet portion 614-1 of the cartridge enlargement unit 610 through the tap water inlet space 622 and the tap water outlet holes 623 formed in the bypass unit 620.

Next, the tap water which flows into the first tap water inlet portion 614-1 may pass through a filter body 610-1 coupled with the first filter accommodating pipe 603-1 and then may be discharged through the first purified water outlet portion 613-1 of the cartridge enlargement unit 610 through a first purified water inlet pipe 604-1 of the first filter accommodating pipe 603-1. The water discharged from the first purified water outlet portion 613-1 may flow into the second tap water inlet portion 614-2 of the cartridge enlargement unit 610 which forms the same space due to the inner partition wall 612, may pass a second filter body 610-2 coupled with the second filter accommodating pipe 603-2, and then may be discharged from the second purified water outlet portion 613-2 of the cartridge enlargement unit 610 through a second purified water inlet pipe 604-2 of the second filter accommodating pipe 603-2.

Next, the tap water which flows into the third tap water inlet portion 614-3 passes through a third filter body 610-3 coupled with the third filter accommodating pipe 603-3 and then is discharged through the third purified water outlet portion 613-3 of the cartridge enlargement unit 610 through the third purified water inlet pipe 604-3 of the third filter accommodating pipe 603-3. The water purified as described above is discharged through the purified water pipe 601 formed in the bypass unit 620 along a moving space formed in a center of the top surface of the cartridge enlargement unit 610 by the inner partition wall 612 formed in the central portion of the cartridge enlargement unit 610.

That is, to form the water purifying process using the serial flow channel structure described above, the serial flow channel type filter cartridge according to the third embodiment, as described above, may include three filter portions 500 in which edges of the three filter accommodating pipes 603-1, 603-2, and 603-3 with circular outer circumferences and triangularly connected central portions at the bottom surface of the cartridge enlargement unit 610.

Here, the top surface of the cartridge enlargement unit 610 is formed to have a shape in which a longitudinal edge perimeter formed above the first to third filter accommodating pipes 603-1, 603-2, and 603-3 is connected as arcs to have a three-leaf shamrock shape and forms a horizontal plane for forming a flow channel. The first to third purified water outlet portions 613-1 613-2, and each formed as a single through hole may be formed at positions corresponding to central portions of the first to third filter accommodating pipes 603-1, 603-2, and 603-3 on the top surface, respectively.

Also, in the cartridge enlargement unit 610, the first purified water outlet portion 613-1 and the second tap water inlet portion 614-2 and the second purified water outlet portion 613-2 and the third tap water inlet portion 614-3 may be connected to one another counterclockwise by forming three or more inner partition walls 612 between the tap water inlet portions 614-1, 614-2, and 614-3 and the purified water outlet portions 613-1, 613-2, and 613-3 corresponding to the first to third filter accommodating pipes 603-1, 603-2, and 603-3, respectively.

Also, in the cartridge enlargement unit 610, the outer partition wall 611 which integrally surrounds the first to third purified water outlet portions 613-1, 613-2, and 613-3 and totally has a three-leaf shamrock shape when viewed from above may be formed on the top surface. The outer partition wall 613 may be formed in a structure which surrounds the three purified water outlet portions 613-1, 613-2, and 613-3, the three tap water inlet portions 614-1, 614-2, and 614-3, and the inner partition walls 612.

Meanwhile, in the embodiment, the cartridge enlargement unit 610, the outer partition wall 611 formed in a structure which surrounds the inner partition wall at a certain interval and totally has a three-leaf shamrock shape. The first to third tap water inlet portions 614-1, 614-2, and 614-3 formed of a plurality of through holes to have semicircular shapes may be formed outside the inner partition walls 612 adjacent to the first to third purified water outlet portions 613-1, 613-2, and 613-3.

Also, the bypass unit 620 may have a shape corresponding to the outer partition wall 612 which has an outer perimeter in a totally three-leaf shamrock shape and the structure of surrounding the inner partition wall 611 at the certain interval.

Here, the bypass unit 620 may include the plurality of tap water outlet holes 623 at a position corresponding to the first tap water inlet portion 614-1 of the cartridge enlargement unit 610.

Figure 14:
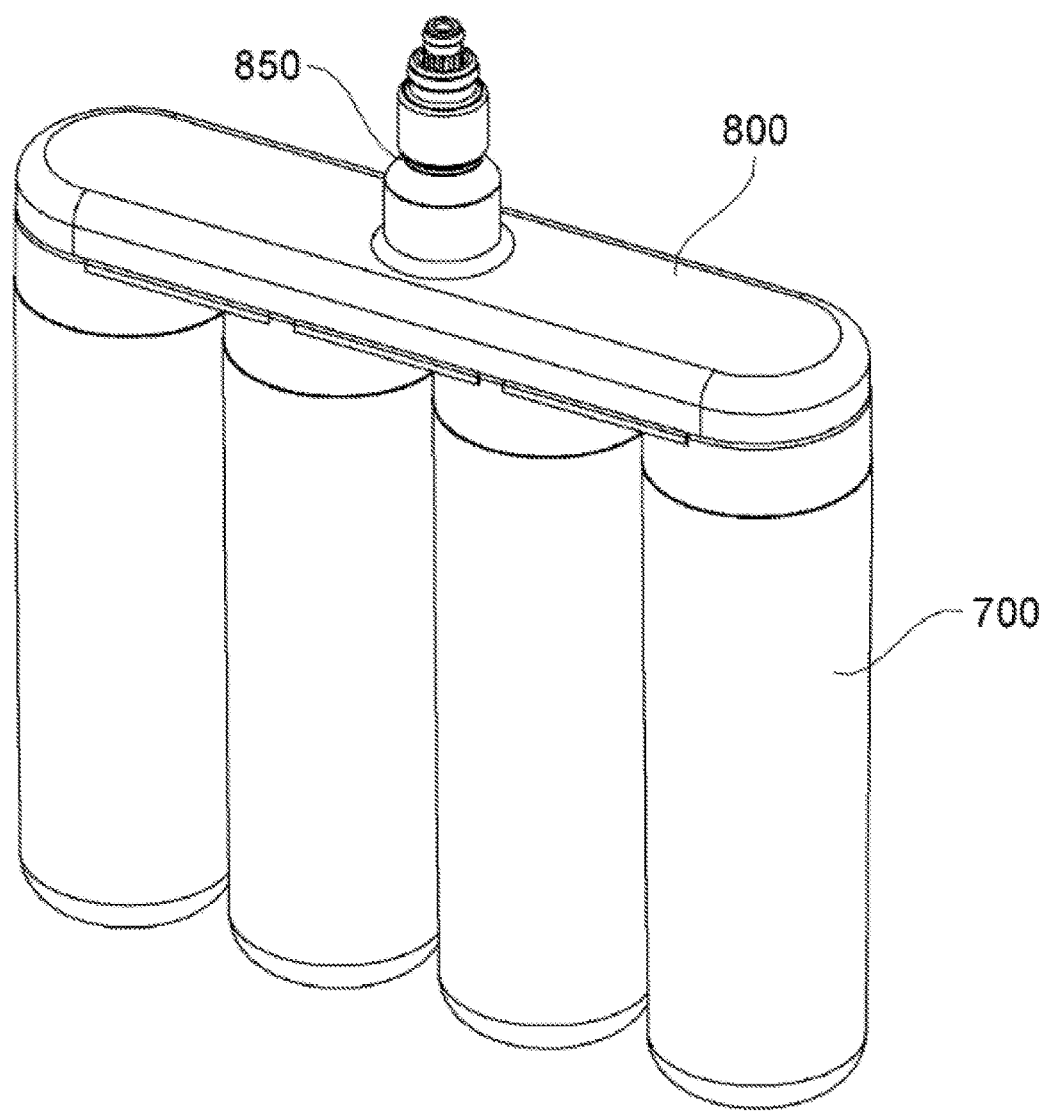
FIGS. 14 and 15 are views of a serial flow channel type filter cartridge including four linearly combined filter bodies according to a fourth embodiment of the present invention.
Figure 15:
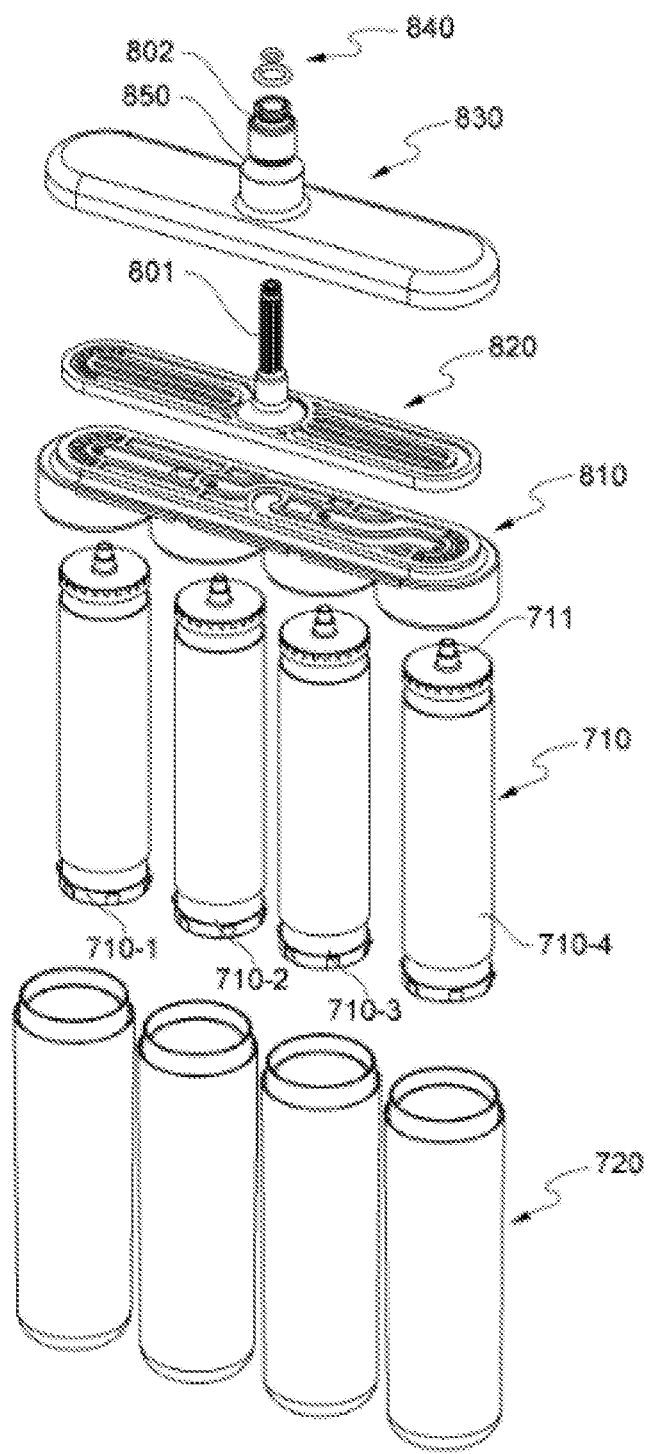

FIGS. 14 and 15 are views of a serial flow channel type filter cartridge including four linearly combined filter bodies according to a fourth embodiment of the present invention.

As shown in the drawings, the serial flow channel type filter cartridge according to the fourth embodiment of the present invention may include a filter portion 700 and a cartridge header 800.

In more detail, the filter portion 700 may include a plurality of filter bodies 710 and a plurality of filter housings 720 corresponding to the plurality of filter bodies 710 and independently accommodating the respective filter bodies 710.

Also, in the cartridge header 800, as shown in the drawings, a top may be formed in a structure in which a single tap water pipe 802 surrounds a perimeter of a single purified water pipe 801 which vertically protrudes and a plurality of filter accommodating pipes 803 respectively coupled with top ends of the plurality of filter housings 720 which form the filter portion 700 to seal an inside of the filter portion 700 may be formed at a bottom.

Here, in the cartridge header 800, a serial structure type flow channel which allows tap water which flows in through the single tap water pipe 802 to sequentially flow into the plurality of filter accommodating pipes 803 and then allows the water purified while sequentially passing through the plurality of filter bodies 710 to be discharged through the single purified water pipe 801 may be formed.

Meanwhile, as shown in the drawings, it may be known that the filter cartridge according to the fourth embodiment of the present invention includes annular sealing members 840 formed at a perimeter of an end of the single tap water pipe 802 and a perimeter of an end of the single purified water pipe 801 and a circular fitting groove 850 formed at the perimeter of the single tap water pipe 802 to allow the tap water pipe 802 to be nondirectionally coupled with a head portion of a filter assembly to which the filter cartridge is fastened.

Figure 16:
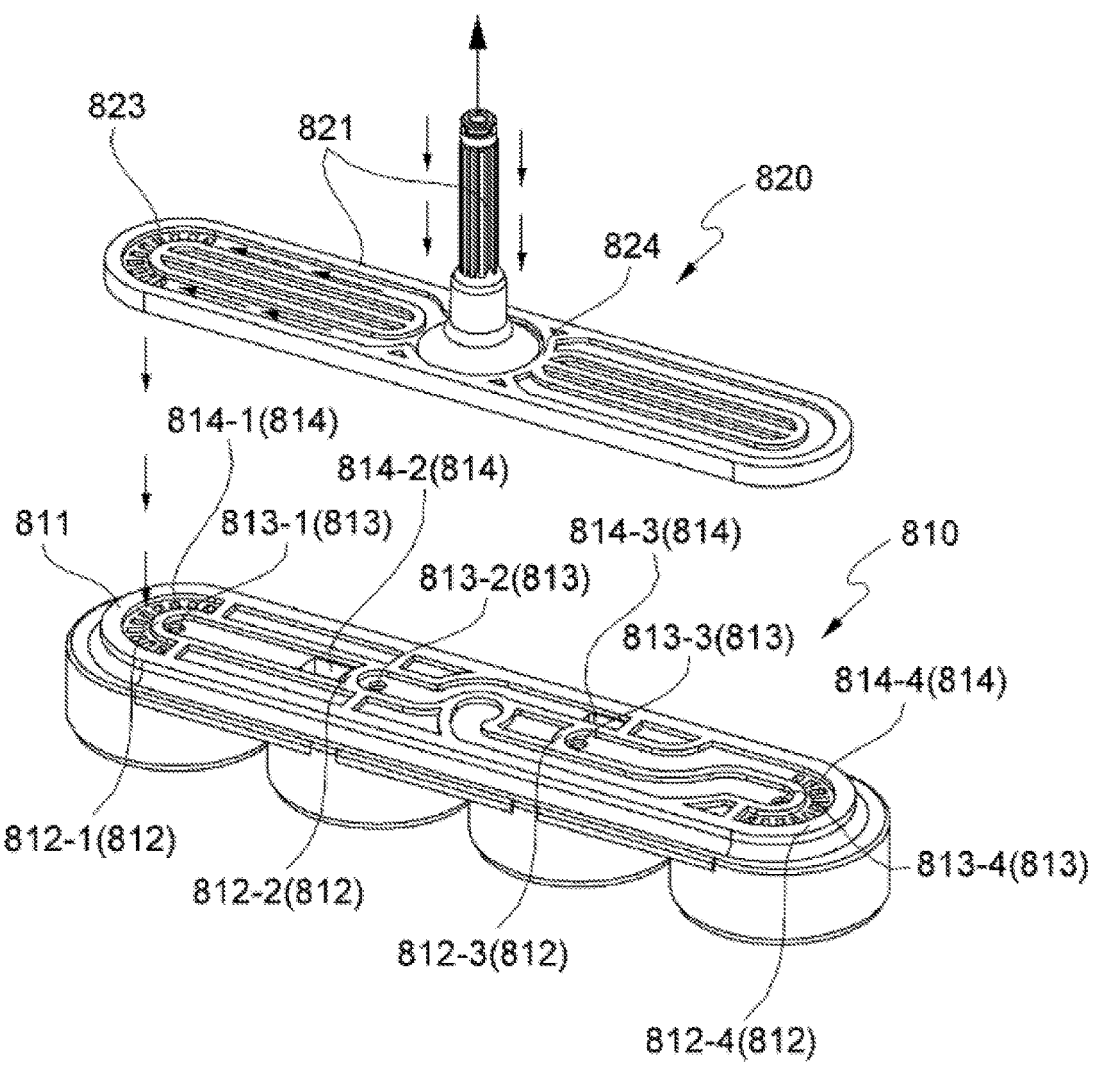
FIGS. 16 and 17 are an exploded view and cross-sectional perspective view of a serial structure type flow channel formed inside a cartridge header according to the fourth embodiment of the present invention.
Figure 17:
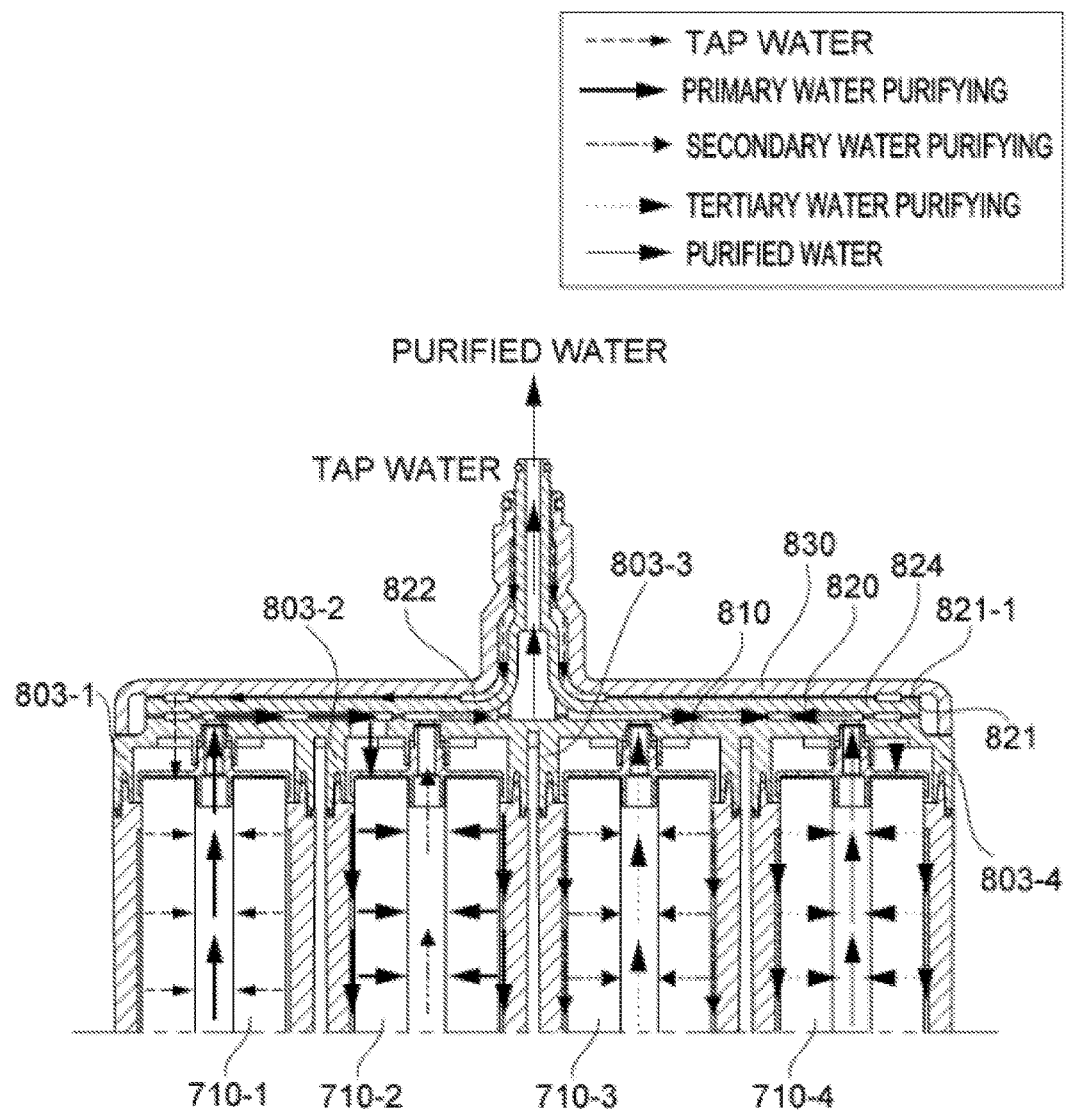

FIGS. 16 and 17 are an exploded view and a cross-sectional perspective view of the serial structure type flow channel formed inside the cartridge header according to the fourth embodiment of the present invention.

Referring to FIGS. 16 and 17, a detailed configuration in the cartridge header 800 for forming the serial structure type flow channel applied to the serial flow channel type filter cartridge according to the fourth embodiment of the present invention will be described below in detail.

As shown in the drawings, the cartridge header 800 according to the fourth embodiment of the present invention may include a cartridge enlargement unit 810 and a bypass unit 820.

In the embodiment, the cartridge enlargement unit 810 may include an outer partition wall 811 formed to allow edges of both ends to have semicircular shapes and having an integrally connected perimeter and inner partition walls 811 which have two or more various shapes to allow moving paths for tap water which flows into a plurality of such filter portions 700 and the purified and discharged water to be different for each filter inside the outer partition wall 811 on a top surface.

Here, due to the outer partition wall 811 and the inner partition walls 812, the tap water which flows in through the single tap water pipe 802 and the water purified while sequentially passing through the plurality of filter portions 700 may move without being mixed with each other.

Also, the cartridge enlargement unit 810 may include the plurality of filter accommodating pipes 803 which each include a purified water inlet pipe 804 through which the purified water flows in from a head 711 of each of the filter bodies 710 and are formed at a bottom surface.

In more detail, the cartridge enlargement unit 810 may include a plurality of purified water outlet portions 813 each formed as a single through hole at a position corresponding to each of the purified water inlet pipes 804 formed in a central portion of each of the plurality of filter accommodating pipes 803.

Also, the cartridge enlargement unit 810, to form a path for the tap water which flows into each of the plurality of filter accommodating pipes 803, may include a plurality of tap water inlet portions 814 each formed of a through hole interposing the most adjacent inner partition wall 812 of each of the plurality of purified water outlet portions 813 therebetween.

Here, when water is purified while sequentially passing through the plurality of filter accommodating pipes 803, a first tap water inlet portion 814-1 corresponding to a path of tap water which flows into a first filter accommodating pipe 803-1 and a last purified water outlet portion 813-4 corresponding to a path for the purified water discharged from a last filter accommodating pipe 803-4 may each form an independent moving space through which the tap water flows into or the purified water is discharged from each of the filter accommodating pipes 803-1 and 803-4 by each of adjacent inner partition walls 812-1 and 812-4.

Here, as shown in the drawings, other tap water inlet portions 814-2, 814-3, and 814-4 except the first tap water inlet portion 814-1 may use the same moving space of purified water outlet portions 813-1, 813-2, and 813-3 of previous filter accommodating pipes 803-1, 803-2, and 803-3.

Also, the first tap water inlet portion 814-1 may be formed at a position corresponding to a tap water outlet hole 823 of the bypass unit 820, which will be described below, and the last purified water outlet portion 813-4 may be formed at a position corresponding to the single purified water pipe 801 of the bypass unit 820.

Also, as shown in the drawings, the plurality of tap water inlet portions 814-1 and 814-4 formed inside edges of both ends of the outer partition wall 811 may have semicircular shapes and the plurality of tap water 814-2 and 814-3 disposed at outer perimeters of the inner partition walls 812-2 and 812-3 located in places corresponding to each other around the purified water pipe 801 may each have a single rectangular through hole.

Meanwhile, in the embodiment, the bypass unit 820 may include an upper step 821 formed of an upwardly protruding outer perimeter of a top surface at an edge to form a tap water inlet space 822 to which the tap water which flows in through the single tap water pipe 402 moves in one direction based on a central portion inside the upper step 821 and an upper partition wall 824 which prevents movement of the tap water which flows in through the single tap water pipe 802 in the other direction based on the central portion inside the upper step 821.

Here, a plurality of such tap water outlet holes 823 which are formed in semicircular shapes and move the tap water to the cartridge enlargement unit 810 may be formed at an outer edge of the tap water inlet space 822 of the upper step 823.

Also, in the bypass unit 820, as shown in the drawings, the single purified water pipe 801 through which the purified water flowing in through the cartridge enlargement unit 810 passes may vertically protrude in a central portion of the tap water inlet space 822.

Also, the bypass unit 820 may be formed in a structure in which the end of the single purified water pipe 801 formed in a central portion of the top surface passes through the end of the single tap water pipe 802 formed at an upper cartridge cover 830 which will be described below.

Also, the bypass unit 820 may include a plurality of partition walls 811-1 and 811-2 formed on a bottom surface, corresponding to the inner partition wall 812 and the outer partition wall 811 formed on the top surface of the cartridge enlargement unit 810 and may be formed as a structure in which the bottom surface covers and seals overall a top of the cartridge enlargement unit 810 as shown in the drawings.

Meanwhile, the serial flow channel type filter cartridge according to the fourth embodiment of the present invention, as shown in FIG. 15, may include the upper cartridge cover 830 formed having a structure in which the single tap water pipe 802 surrounding the perimeter of the single purified water pipe 801 formed at the bypass unit 820 is formed in a central portion of a top surface, a watertight partition wall 821-1 corresponding to the upper step 821 of the bypass unit 820 and a lower partition wall 824-1 corresponding to the upper partition wall 824 are formed on a bottom surface, and an outer perimeter of the bottom surface surrounds and seals the outer partition wall 811 of the cartridge enlargement unit 810.

Here, in the case of the serial flow channel type filter cartridge according to the fourth embodiment of the present invention, when the tap water flows in through a gap between an outer surface of the single purified water pipe 801 and an inner surface of the single tap water pipe 802 due to the upper cartridge cover 830, the tap water may be allowed to move only in one direction based on the top surface of the bypass unit 820 to flow into the cartridge header 800.

Also, referring to FIGS. 16 and 17, in a process of purifying water using the serial type flow channel type filter cartridge according to the fourth embodiment of the present invention, when the tap water flows in through the single tap water pipe 802 which forms the upper cartridge cover 830, the tap water is allowed to flow only in one direction based on the top surface of the bypass unit 820, thereby flowing into the first tap water inlet portion 814-1 of the cartridge enlargement unit 810 through the tap water inlet space 822 and the tap water outlet holes 823 formed in the bypass unit 820.

Next, the tap water which flows into the first tap water inlet portion 814-1 may pass through a filter body 810-1 coupled with the first filter accommodating pipe 803-1 and then may be discharged through the first purified water outlet portion 813-1 of the cartridge enlargement unit 810 through a first purified water inlet pipe 804-1 of the first filter accommodating pipe 803-1. The water discharged from the first purified water outlet portion 813-1 may flow into the second tap water inlet portion 814-2 of the cartridge enlargement unit 810 which forms the same space due to the inner partition wall 812, may pass a second filter body 810-2 coupled with the second filter accommodating pipe 803-2, and then may be discharged from the second purified water outlet portion 813-2 of the cartridge enlargement unit 810 through a second purified water inlet pipe 804-2 of the second filter accommodating pipe 803-2.

Next, the tap water which flows into the third tap water inlet portion 814-3 may pass through a third filter body 810-3 coupled with the third filter accommodating pipe 803-3 and then may be discharged from the third purified water outlet portion 813-3 of the cartridge enlargement unit 810 through a third purified water inlet pipe 804-3 of the third filter accommodating pipe 803-3. The water discharged from the third purified water outlet portion 813-3 may flow into the fourth tap water inlet portion 814-4 of the cartridge enlargement unit 810 which forms the same space due to the inner partition wall 812, may pass a fourth filter body 810-4 coupled with the fourth filter accommodating pipe 803-4, and then may be discharged from the fourth purified water outlet portion 813-4 of the cartridge enlargement unit 810 through a fourth purified water inlet pipe 804-4 of the fourth filter accommodating pipe 803-4.

The water purified as described above is discharged through the purified water pipe 801 formed in the bypass unit 820 along the moving space formed in a center of the top surface of the cartridge enlargement unit 810 due to the inner partition wall 812 formed in the central portion of the cartridge enlargement unit 810.

That is, to form the water purifying process using the serial flow channel structure described above, the serial flow channel type filter cartridge according to the fourth embodiment, as described above, may include four filter portions 700 by sequentially forming and adjacently disposing four filter accommodating pipes 803 with circular outer circumferences and linearly connected central portions at the bottom surface of the cartridge enlargement unit 810.

Here, the top surface of the cartridge enlargement unit 810 is formed to have a shape in which a longitudinal edge perimeter formed above the first to fourth filter accommodating pipes 803-1, 803-2, 803-3, and 803-4 is linearly connected to form a horizontal plane for forming a flow channel. The first to fourth purified water outlet portions 813-1, 813-2, 813-3, and 813-4 each formed as a single through hole may be formed at positions corresponding to central portions of the first to fourth filter accommodating pipes 803-1, 803-2, 803-3, and 803-4 on the top surface, respectively.

Also, the cartridge enlargement unit 810 may include the first and fourth tap water inlet portions 814-1 and 814-4 formed of a plurality of through holes to have semicircular shapes outside the inner partition wall 812 adjacent to the first and fourth purified outlet portions 813-1 and 813-4 and may sequentially form the second tap water inlet portion 814-2 and third tap water inlet portion 814-3 each formed of a single through hole having a rectangular shape outside the inner partition wall 812 adjacent to the second purified water outlet portion 813-2 and the third purified water outlet portion 813-3 sequentially formed in the central portion.

Here, the first purified water outlet portion 813-1 and the second tap water inlet portion 814-2, the second purified water outlet portion 813-2 and the third tap water inlet portion 814-3, and the third purified water outlet portion 813-3 and the fourth tap water inlet portion 814-4 may be connected to one another by forming four inner partition walls 812 between the tap water inlet portions 814-1, 814-2, 814-3, and 814-4 and the purified water outlet portions 813-1, 813-2, 813-3, and 813-4 corresponding to the first to fourth filter accommodating pipes 803-1, 803-2, 803-3, and 803-4, respectively.

Also, in the cartridge enlargement unit 810, the outer partition wall 811 which integrally surrounds the first to fourth purified water outlet portions 813-1, 813-2, 813-3, and 813-4 and totally has a caterpillar structure when viewed from above may be formed on the top surface. The outer partition wall 811 may be formed in a structure which surrounds the four purified water outlet portions 813-1, 813-2, 813-3, and 813-4, the four tap water inlet portions 814-1, 814-2, 814-3, and 814-4, and the inner partition walls 812.

Meanwhile, according to the embodiment, in the cartridge enlargement unit 810, the four tap water inlet portions 814 semicircular shapes and rectangular shapes may be formed between the outer partition wall 811 and the inner partition wall 812.

Also, the bypass unit 820 may have a shape corresponding to the outer partition wall 811 which has an outer perimeter in a totally caterpillar structure and the structure of surrounding the inner partition wall 812 at the certain interval.

Here, the bypass unit 820 may include the plurality of tap water outlet holes 823 at a position corresponding to the first tap water inlet portion 814-1 of the cartridge enlargement unit 810.

Figure 18:
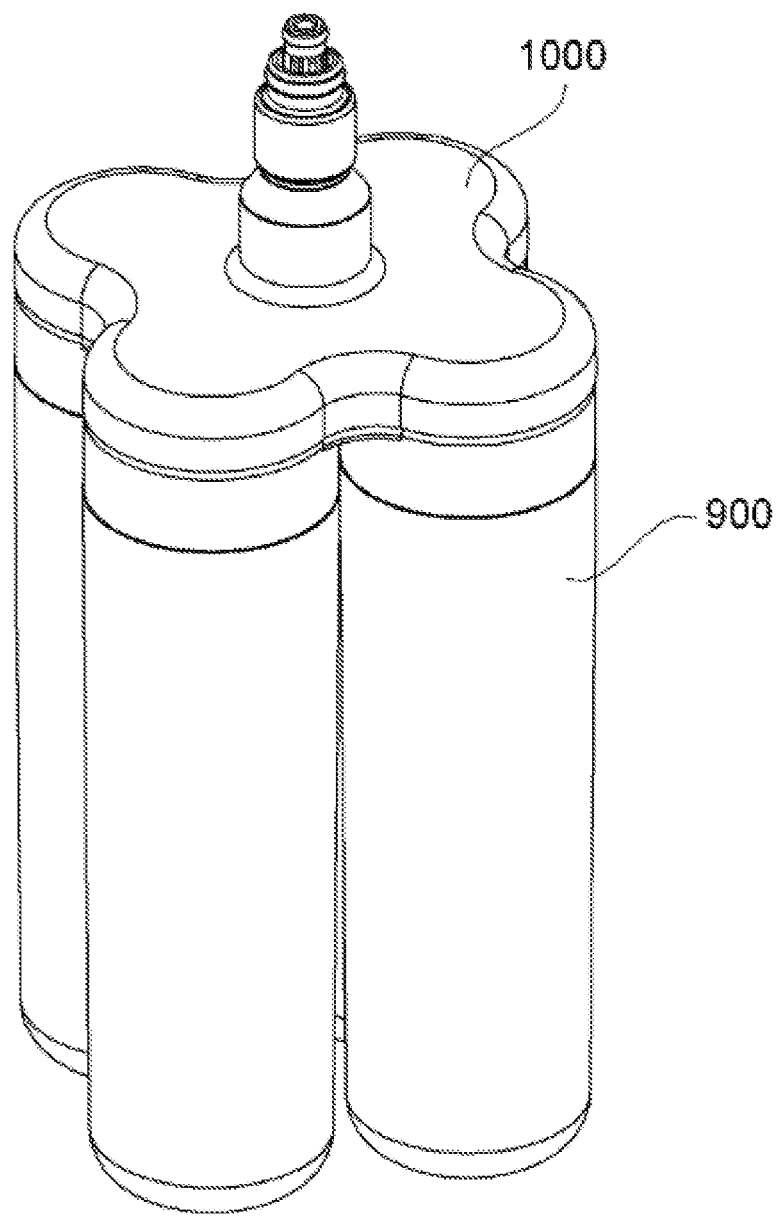
FIGS. 18 and 19 are views of a serial flow channel type filter cartridge including four rectangularly combined filter bodies according to a fifth embodiment of the present invention.
Figure 19:
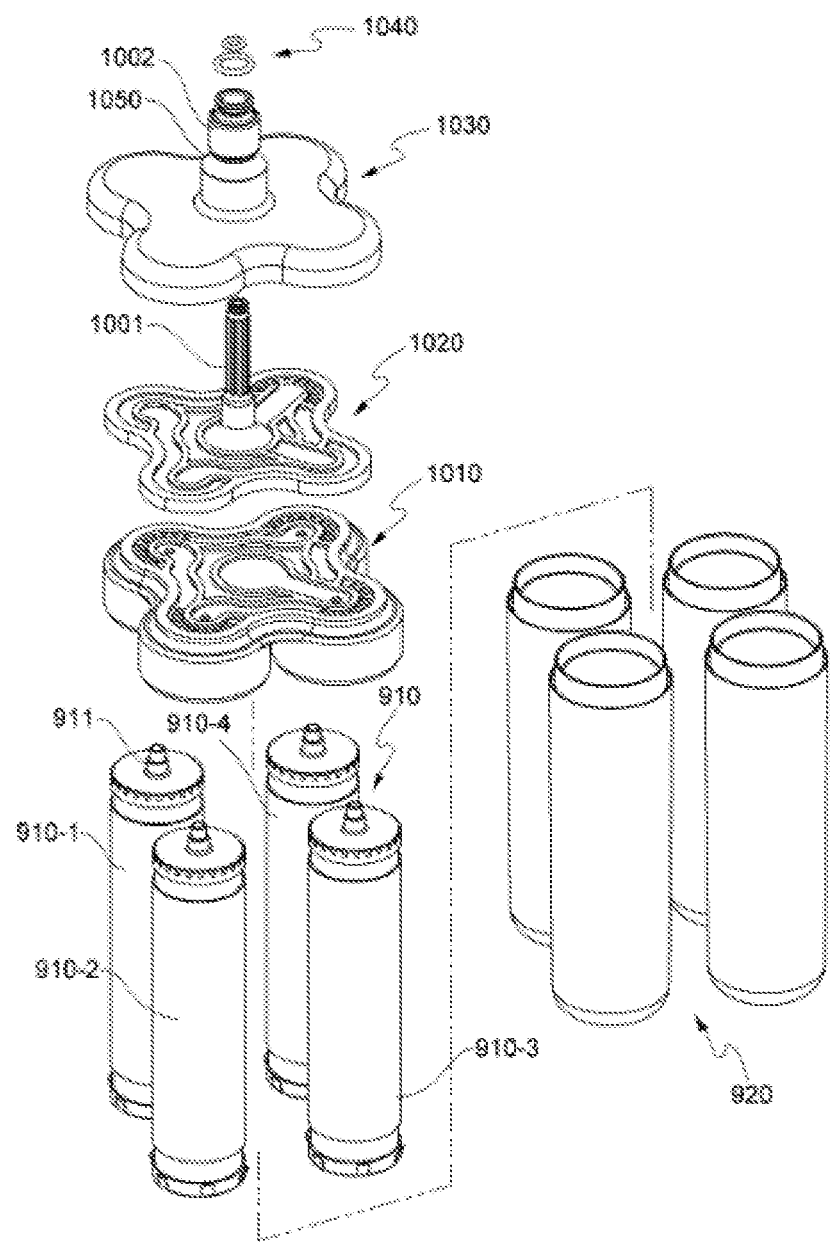

FIGS. 18 and 19 are views of a serial flow channel type filter cartridge including four rectangularly combined filter bodies according to a fifth embodiment of the present invention.

As shown in the drawings, the serial flow channel type filter cartridge according to the fifth embodiment of the present invention may include a filter portion 900 and a cartridge header 1000.

In more detail, the filter portion 900 may include a plurality of filter bodies 910 and a plurality of filter housings 920 corresponding to the plurality of filter bodies 910 and independently accommodating the respective filter bodies 910.

Also, in the cartridge header 1000, as shown in the drawings, a top may be formed in a structure in which a single tap water pipe 1002 surrounds a perimeter of a single purified water pipe 1001 which vertically protrudes and a plurality of filter accommodating pipes 1003 respectively coupled with top ends of the plurality of filter housings 920 which form the filter portion 900 to seal an inside of the filter portion 900 may be formed at a bottom.

Here, in the cartridge header 1000, a serial structure type flow channel which allows tap water which flows in through the single tap water pipe 1002 to sequentially flow into the plurality of filter accommodating pipes 1003 and then allows the water purified while sequentially passing through the plurality of filter bodies 910 to be discharged through the single purified water pipe 1001 may be formed.

Meanwhile, as shown in the drawings, it may be known that the filter cartridge according to the fifth embodiment of the present invention includes annular sealing members 1040 formed at a perimeter of an end of the single tap water pipe 1002 and a perimeter of an end of the single purified water pipe 1001 respectively and a circular fitting groove 1050 formed at the perimeter of the single tap water pipe 1002 to allow the tap water pipe 1002 to be nondirectionally coupled with a head portion of a filter assembly to which the filter cartridge is fastened.

Figure 20:
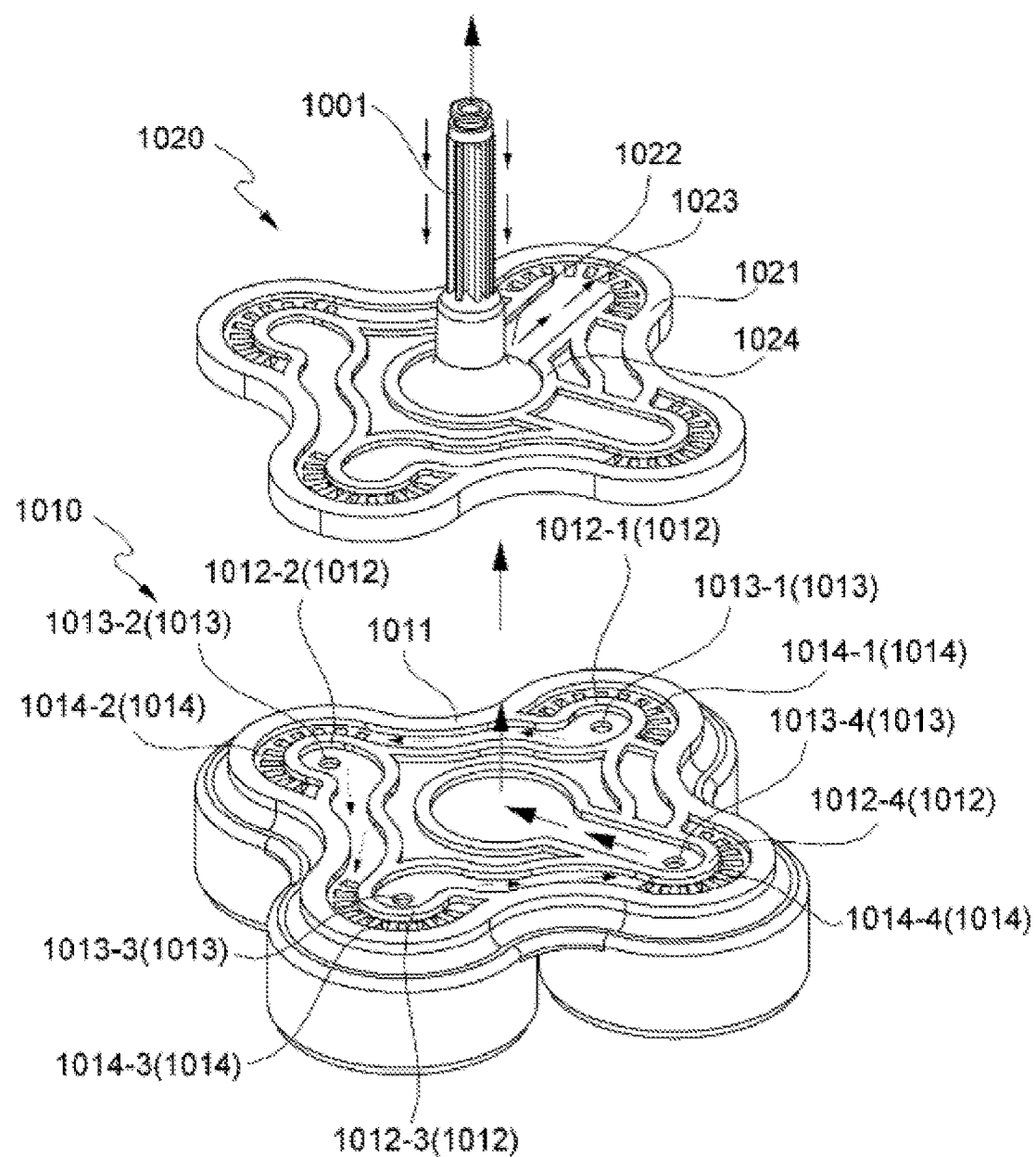
FIGS. 20 and 21 are an exploded view and cross-sectional perspective view of a serial structure type flow channel formed inside a cartridge header according to the fifth embodiment of the present invention.
Figure 21:
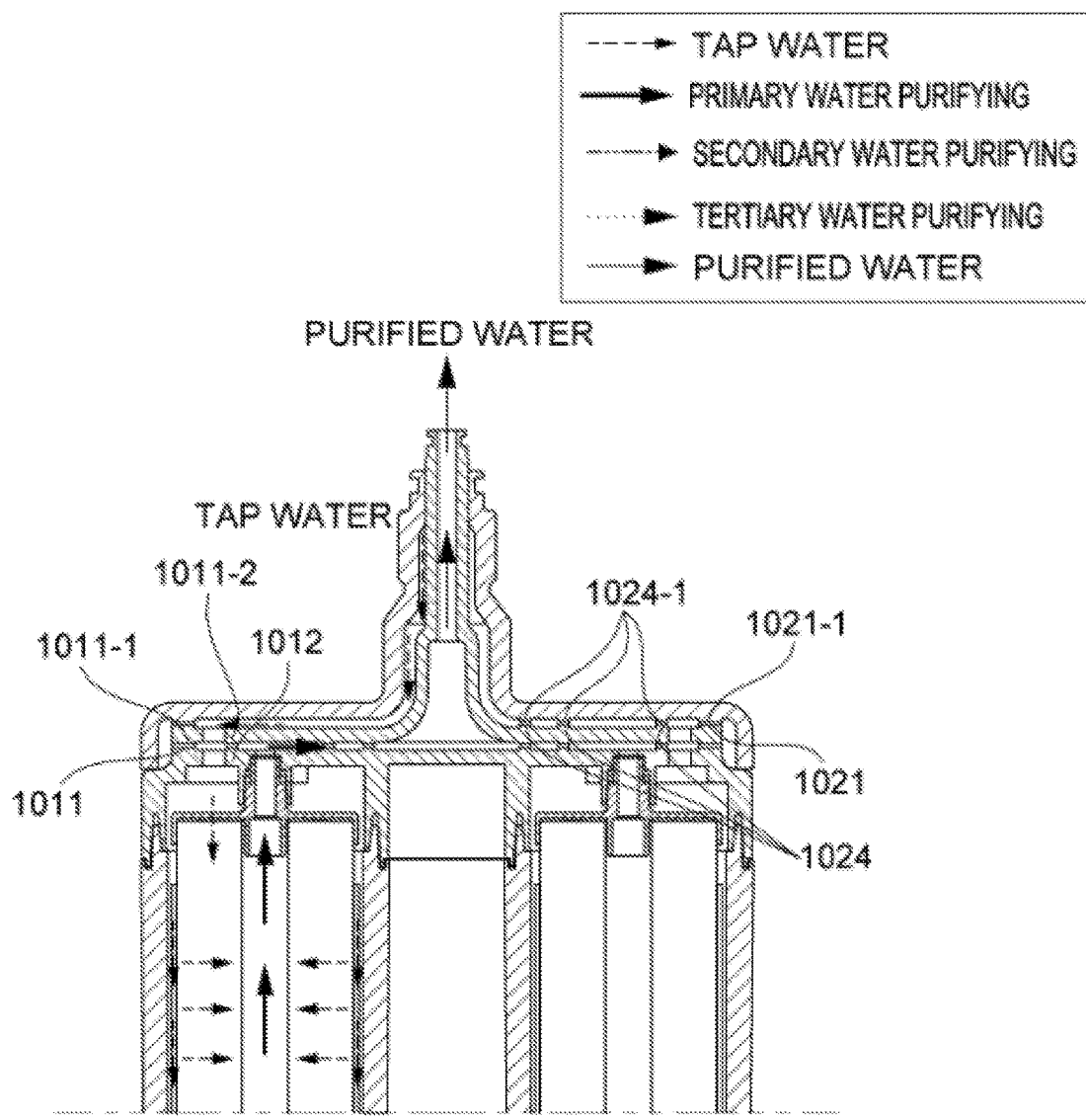

FIGS. 20 and 21 are an exploded view and a cross-sectional perspective view of a serial structure type flow channel formed inside the cartridge header according to the fifth embodiment of the present invention.

Referring to FIGS. 20 and 21, a detailed configuration in the cartridge header 1000 for forming the serial structure type flow channel applied to the rectangular filter cartridge according to the fifth embodiment of the present invention will be described below in detail.

As shown in the drawings, the cartridge header 1000 according to the fifth embodiment of the present invention may include a cartridge enlargement unit 1010 and a bypass unit 1020.

In the embodiment, the cartridge enlargement unit 1010 may include an outer partition wall 1011 formed to allow an edge with a semicircular shape and having an integrally connected perimeter to have a four-leaf shamrock shape and inner partition walls 1011 which have two or more various shapes to allow moving paths for tap water which flows into a plurality of such filter portions 900 and the purified and discharged water to be different for each filter inside the outer partition wall 1011 on a top surface.

Here, due to the outer partition wall 1011 and the inner partition walls 1012, the tap water which flows in through the single tap water pipe 1002 and the water purified while sequentially passing through the plurality of filter portions 900 may move without being mixed with each other.

Also, the cartridge enlargement unit 1010 may include the plurality of filter accommodating pipes 1003 which each include a purified water inlet pipe 1004 through which the purified water flows in from a head 1011 of each of the filter bodies 1010 and are formed at a bottom surface.

In more detail, the cartridge enlargement unit 1010 may include a plurality of purified water outlet portions 1013 each formed as a single through hole at a position corresponding to each of the purified water inlet pipes 1004 formed in a central portion of each of the plurality of filter accommodating pipes 1003.

Also, the cartridge enlargement unit 1010, to form a path for the tap water which flows into each of the plurality of filter accommodating pipes 1003, may include a plurality of tap water inlet portions 1014 each formed of a through hole interposing the most adjacent inner partition wall 1012 of each of the plurality of purified water outlet portions 1013 therebetween.

Here, when water is purified while sequentially passing through the plurality of filter accommodating pipes 1003, a first tap water inlet portion 1014-1 corresponding to a path of tap water which flows into a first filter accommodating pipe 1003-1 and a last purified water outlet portion 1013-4 corresponding to a path for the purified water discharged from a last filter accommodating pipe 1003-4 may each form an independent moving space through which the tap water flows into or the purified water is discharged from each of the filter accommodating pipes 1003-1 and 1003-4 by each of adjacent inner partition walls 1012-1 and 1012-4.

Here, as shown in the drawings, other tap water inlet portions 1014-2, 1014-3, and 1014-4 except the first tap water inlet portion 1014-1 may use the same moving space of purified water outlet portions 1013-1, 1013-2, and 1013-3 of previous filter accommodating pipes 1003-1, 1003-2, and 1003-3.

Also, the first tap water inlet portion 1014-1 may be formed at a position corresponding to a tap water outlet hole 1023 of the bypass unit 10203, which will be described below, and the last purified water outlet portion 1013-4 may be formed at a position corresponding to the single purified water pipe 1001 of the bypass unit 1020.

Also, as shown in the drawings, the plurality of tap water inlet portions 1014-1, 1014-2, 1014-3, and 1014-4 are provided in semicircular shapes inside the edge for forming the four-leaf shamrock shape of the outer partition wall 1011.

Meanwhile, in the embodiment, the bypass unit 1020 may include an upper step 1021 formed of an upwardly protruding outer perimeter of a top surface at an edge to form a tap water inlet space 1022 to which the tap water which flows in through the single tap water pipe 402 moves in one direction based on a central portion inside the upper step 1021 and an upper partition wall 1024 which prevents movement of the tap water which flows in through the single tap water pipe 1002 in the other direction based on the central portion inside the upper step 1021.

Here, a plurality of such tap water outlet holes 1023 which are formed in semicircular shapes and move the tap water to the cartridge enlargement unit 1010 may be formed at an outer edge of the tap water inlet space 1022 of the upper step 1021.

Also, in the bypass unit 1020, as shown in the drawings, the single purified water pipe 1001 through which the purified water flowing in through the cartridge enlargement unit 1010 passes may vertically protrude in a central portion of the tap water inlet space 1022.

Also, the bypass unit 1020 may be formed in a structure in which the end of the single purified water pipe 1001 formed in a central portion of the top surface passes through the end of the single tap water pipe 1002 formed at an upper cartridge cover 1030 which will be described below.

Also, the bypass unit 1020 may include a plurality of partition walls 1011-1 and 1011-2 formed on a bottom surface, corresponding to the inner partition wall 1012 and the outer partition wall 1011 formed on the top surface of the cartridge enlargement unit 1010 and may be formed as a structure in which the bottom surface covers and seals overall a top of the cartridge enlargement unit 1010 as shown in the drawings.

Meanwhile, the serial flow channel type filter cartridge according to the fifth embodiment of the present invention, as shown in FIG. 19, may include the upper cartridge cover 1030 formed having a structure in which the single tap water pipe 1002 surrounding the perimeter of the single purified water pipe 1001 formed at the bypass unit 1020 is formed in a central portion of a top surface, a watertight partition wall 1021-1 corresponding to the upper step 1021 of the bypass unit 1020 and a lower partition wall 1024-1 corresponding to the upper partition wall 1024 are formed on a bottom surface, and an outer perimeter of the bottom surface surrounds and seals the outer partition wall 1011 of the cartridge enlargement unit 1010.

Here, in the case of the serial flow channel type filter cartridge according to the fifth embodiment of the present invention, when the tap water flows in through a gap between an outer surface of the single purified water pipe 1001 and an inner surface of the single tap water pipe 1002 due to the upper cartridge cover 1030, the tap water may be allowed to move only in one direction based on the top surface of the bypass unit 1020 to flow into the cartridge header 1000.

Also, referring to FIGS. 20 and 21, in a process of purifying water using the serial type flow channel type filter cartridge according to the fifth embodiment of the present invention, when the tap water flows in through the single tap water pipe 1002 which forms the upper cartridge cover 1030, the tap water is allowed to flow only in one direction based on the top surface of the bypass unit 1020, thereby flowing into the first tap water inlet portion 1014-1 of the cartridge enlargement unit 1010 through the tap water inlet space 1022 and the tap water outlet holes 1023 formed in the bypass unit 1020.

Next, the tap water which flows into the first tap water inlet portion 1014-1 may pass through a filter body 1010-1 coupled with the first filter accommodating pipe 1003-1 and then may be discharged through the first purified water outlet portion 1013-1 of the cartridge enlargement unit 1010 through a first purified water inlet pipe 1004-1 of the first filter accommodating pipe 1003-1. The water discharged from the first purified water outlet portion 1013-1 may flow into the second tap water inlet portion 1014-2 of the cartridge enlargement unit 1010 which forms the same space due to the inner partition wall 1012, may pass a second filter body 1010-2 coupled with the second filter accommodating pipe 1003-2, and then may be discharged from the second purified water outlet portion 1013-2 of the cartridge enlargement unit 1010 through a second purified water inlet pipe 1004-2 of the second filter accommodating pipe 1003-2.

Next, the tap water which flows into the third tap water inlet portion 1014-3 may pass through a third filter body 1010-3 coupled with the third filter accommodating pipe 1003-3 and then may be discharged from the third purified water outlet portion 1013-3 of the cartridge enlargement unit 1010 through a third purified water inlet pipe 1004-3 of the third filter accommodating pipe 1003-3. The water discharged from the third purified water outlet portion 1013-3 may flow into the fourth tap water inlet portion 1014-4 of the cartridge enlargement unit 1010 which forms the same space due to the inner partition wall 1012, may pass a fourth filter body 1010-4 coupled with the fourth filter accommodating pipe 1003-4, and then may be discharged from the fourth purified water outlet portion 1013-4 of the cartridge enlargement unit 1010 through a fourth purified water inlet pipe 1004-4 of the fourth filter accommodating pipe 1003-4.

The water purified as described above is discharged through the purified water pipe 1001 formed in the bypass unit 1020 along the moving space formed in a center of the top surface of the cartridge enlargement unit 1010 due to the inner partition wall 1012 formed in the central portion of the cartridge enlargement unit 1010.

That is, to form the water purifying process using the serial flow channel structure described above, the serial flow channel type filter cartridge according to the fifth embodiment, as described above, may include four filter portions 900 in which edges of the four filter accommodating pipes 1003-1, 1003-2, 1003-3, and 1003-4 with circular outer circumferences and rectangularly connected central portions at the bottom surface of the cartridge enlargement unit 1010.

Here, the top surface of the cartridge enlargement unit 1010 is formed to have a shape in which a longitudinal edge perimeter formed above the first to fourth filter accommodating pipes 1003-1, 1003-2, 1003-3, and 1003-4 is connected as arcs to have a four-leaf shamrock shape and forms a horizontal plane for forming a flow channel. The first to fourth purified water outlet portions 1013-1.1013-2, 1013-3, and 1013-4 each formed as a single through hole may be sequentially formed at positions corresponding to central portions of the first to fourth filter accommodating pipes 1003-1, 1003-2, 1003-3, and 1003-4 on the top surface, respectively.

Also, in the cartridge enlargement unit 1010, the first purified water outlet portion 1013-1.1003 and the second tap water inlet portion 1014-2, the second purified water outlet portion 1013-2 and the third tap water inlet portion 1014-3, the third purified water outlet portion 1013-3 and the fourth tap water inlet portion 1014-4 may be connected to one another counterclockwise by forming four or more inner partition walls 1014 between the tap water inlet portions 1014-1, 1014-2, 1014-3, and 1014-3 and the purified water outlet portions 1013-1, 1013-2, 1013-3, and 1014-4 corresponding to the first to fourth filter accommodating pipes 1003-1, 1003-2, 1003-3, and 1003-4, respectively.

Also, in the cartridge enlargement unit 1010, the outer partition wall 1011 which integrally surrounds the first to fourth purified water outlet portions 1013-1, 1013-2, 1013-3, and 1013-4 and totally has a four-leaf shamrock shape when viewed from above may be formed on the top surface. The outer partition wall 1011 may be formed in a structure which surrounds the four purified water outlet portions 1013-1, 1013-2, 1013-3, and 10813-4, the four tap water inlet portions 1014-1, 1014-2, 1014-3, and 1014-4, and the inner partition walls 1012.

Meanwhile, in the embodiment, in the cartridge enlargement unit 1010, the outer partition wall 1011 formed in the structure which surrounds the inner partition wall 1012 at a certain interval and totally has the four-leaf shamrock shape. The first to fourth tap water inlet portions 1014-1, 1014-2, and 1014-3, 1014-4 formed of a plurality of through holes to have semicircular shapes may be formed outside the inner partition walls 1012 adjacent to the first to fourth purified water outlet portions 1014-1, 1013-2, 1013-3, and 1013-4.

Also, the bypass unit 1020 may have a shape corresponding to the outer partition wall 1011 which has an outer perimeter in a totally four-leaf shamrock shape and the structure of surrounding the inner partition wall 1012 at the certain interval.

Here, the bypass unit 1020 may include the plurality of tap water outlet holes 1023 at a position corresponding to the first tap water inlet portion 1014-1 of the cartridge enlargement unit 1010.

As described above, according to one embodiment of the present invention, a cartridge header which includes a serial type flow channel capable of using a plurality of filter bodies is provided to increase filterability and to easily maintain and repair a filter.

Also, since a plurality of filter bodies may be coupled with a cartridge header which includes a single tap water inlet and a single purified water outlet, additional components for coupling a plurality of filter cartridges with a filter head are unnecessary, thereby reducing manufacturing costs and preventing a wasteful use of resources.

Also, a cartridge header with a built-in serial type flow channel capable of sequentially passing through many filter bodies is used, thereby providing water purifying effects of various functions in a single cartridge.

Also, when a serial flow channel is formed in a cartridge header, since the flow channel is formed on a top surface of a cartridge enlargement unit using an inner partition wall and an outer partition wall, a complicated configuration is unnecessary, thereby easily manufacturing and reducing manufacturing costs to increase productivity.

Also, a circular fitting groove is formed on a perimeter of a single tap water pipe to allow the tap water pipe to be nondirectionally coupled with a head portion of a filter assembly to which a filter cartridge is fastened, thereby providing excellent compatibility to be applied to various filter assemblies.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, in the embodiments, it has been described that a cartridge header has a structure in which a tap water pipe surrounds a purified water pipe. However, the tap water pipe and the purified water pipe are switched in such a way that the purified water pipe may surround the tap water pipe. In this case, moving paths of tap water and purified water will be reversed. Therefore the embodiments described above should be descriptively considered not in a limitative viewpoint. The scope of the present invention is shown in the following claims not in the described above, and all differences within the range of equivalents thereof should be understood as being included in the present invention.

What is claimed is:

1. A serial flow channel type filter cartridge comprising:
    a filter portion which comprises a plurality of filter bodies and a plurality of filter housings corresponding to the plurality of filter bodies and independently accommodating the respective filter bodies; and
    a cartridge header in which a top is formed in a structure in which a tap water pipe surrounds a perimeter of a purified water pipe which vertically protrudes, a plurality of filter accommodating pipes coupled with top ends of the plurality of filter housings which form the filter portion to seal an inside of the filter portion are formed at a bottom, and a serial structure type flow channel which allows tap water which flows in through the tap water pipe to sequentially flow into the plurality of filter accommodating pipes and then allows the water purified by sequentially passing through the plurality of filter bodies to be discharged through the purified water pipe formed therein.

2. The serial flow channel type filter cartridge of claim 1, wherein the cartridge header comprises:
    a cartridge enlargement unit in which the plurality of filter accommodating pipes which each comprise a purified water inlet pipe into which the purified water flows from a head of each of the filter bodies are formed on a bottom surface and the tap water which flows in through the tap water pipe and the purified water sequentially passing through the plurality of filter bodies are allowed to move respectively on a top surface;
    a bypass unit in which a tap water inlet space to which the tap water which flows in through the tap water pipe moves is formed to move the tap water to the cartridge enlargement unit and the purified water pipe vertically protrudes from a central portion of the top surface; and
    an upper cartridge cover in which the tap water pipe which surrounds the perimeter of the purified water pipe of the bypass unit is formed in a central portion of a top surface.

3. The serial flow channel type filter cartridge of claim 2, wherein the cartridge enlargement unit has a structure in which an outer partition wall which is formed on a top surface and has an integrally connected perimeter and inner partition walls in two or more various shapes to allow transfer paths of the tap water which flows into the plurality of filter bodies and the water purified and discharged therefrom to be mutually different for each filter are formed to allow the tap water which flows in through the tap water pipe and the water purified while sequentially passing through the plurality of filter bodies to move while being not mixed with each other,
    wherein the bypass unit has a structure in which an upper step formed of an upwardly protruding an outer perimeter of the top surface is provided on an edge, the tap water inlet space is formed in one direction based on a central portion inside the upper step, an upper partition wall which prevent movement of the tap water which flows in through the tap water pipe is formed in the other direction, and a tap water outlet hole which moves the tap water to the cartridge enlargement unit is formed on an outer perimeter of the tap water inlet space, and wherein the upper cartridge cover has a structure in which a watertight partition wall corresponding to the upper step of the bypass unit and a lower partition wall corresponding to the upper partition wall of the bypass unit are formed on a bottom surface to allow the tap water to move only in one direction based on the top surface of the bypass unit when the tap water flows in through a gap between an outer surface of the purified water pipe and an inner surface of the tap water pipe, and an outer perimeter surrounds and seals the outer partition wall of the cartridge enlargement unit.

4. The serial flow channel type filter cartridge of claim 3, wherein the cartridge enlargement unit comprises:

a plurality of purified water outlet portions each formed as a single through hole at a position corresponding to each of the purified water inlet pipes formed in central portions of the plurality of filter accommodating pipes; and a plurality of tap water inlet portions each formed as a through hole interposing the most adjacent inner partition wall of each of the plurality of purified water outlet portions therebetween to form a path for the tap water which flows into each of the plurality of filter accommodating pipes, wherein when water is purified while sequentially passing through the plurality of filter accommodating pipes, a first tap water inlet portion corresponding to the path for the tap water which flows in through a first filter accommodating pipe and a last purified water outlet portion corresponding to a path for purified water discharged from a last filter accommodating pipe each form an independent moving space through which the tap water flows in or the purified water is discharged from the respective filter accommodating pipes by the respective adjacent inner partition walls, wherein other tap water inlet portions except the first tap water inlet portion each use the same moving space of the purified water outlet portion of a previous filter accommodating pipe, and wherein the first tap water inlet portion is formed at a position corresponding to the tap water outlet hole of the bypass unit and the last purified water outlet portion is formed at a position corresponding to the purified water pipe of the bypass unit.

5. The serial flow channel type filter cartridge of claim 4, wherein the bypass unit is formed in a structure in which an end of the purified water pipe formed in the central portion of the top surface passes through an end of the tap water pipe formed in the upper cartridge cover, a plurality of partition walls corresponding to the inner partition wall and the outer partition wall formed on the top surface of the cartridge enlargement unit are provided on the bottom surface, and the bottom surface covers and seals overall a top of the cartridge enlargement unit.

6. The serial flow channel type filter cartridge of claim 5, wherein annular sealing members are formed at a perimeter of the end of the tap water pipe formed in the upper cartridge cover and a perimeter of the end of the purified water pipe formed in the bypass unit, respectively, and wherein a fitting groove is formed at a perimeter of the tap water pipe to allow the tap water pipe to be nondirectionally coupled with a head portion of a filter assembly to which the filter cartridge is fastened.

7. The serial flow channel type filter cartridge of claim 3, wherein the cartridge enlargement unit has a structure in which two filter accommodating pipes which are adjacently disposed and have circular outer circumferences and linearly connected central portions are formed on the bottom surface, the top surface has a shape in which perimeters of longitudinal edges formed at tops of the two filter accommodating pipes are linearly connected, two purified water outlet portions each formed as a single through hole are formed at positions on the top surface corresponding to central portions of the two filter accommodating pipes, two tap water inlet portions formed as a plurality of through holes in semicircular shapes are formed outside the two purified water outlet portions, two inner partition walls are each formed between the tap water inlet portion and the purified water outlet portion corresponding to each of the two filter accommodating pipes to allow a first purified water outlet portion and a second tap water inlet portion to be connected, and the outer partition wall has a caterpillar structure outside the top surface and surrounds the two purified water outlet portions, the two tap water inlet portions, and the inner partition walls, and wherein the bypass unit totally has a caterpillar structure and a shape corresponding to the outer partition wall and comprises a plurality of tap water outlet holes at positions corresponding to the first tap water inlet portion of the cartridge enlargement unit.

8. The serial flow channel filter cartridge of claim 3, wherein the cartridge enlargement unit has a structure in which three filter accommodating pipes which are sequentially disposed to be adjacent one another and have circular outer circumferences and linearly connected central portions are formed on the bottom surface, the top surface has a shape in which perimeters of longitudinal edges formed at tops of the three filter accommodating pipes are linearly connected, three purified water outlet portions each formed as a single through hole are formed at positions on the top surface corresponding to central portions of the three filter accommodating pipes, first and second tap water inlet portions which have semicircular shapes outside first and second purified water outlet portions disposed on both edges of the three purified water outlet portions and are formed of a plurality of through holes are formed and a third tap water inlet portion corresponding to a third purified water outlet portion is formed of a single through hole, three inner partition walls are each formed between the tap water inlet portion and the purified water outlet portion corresponding to each of the three filter accommodating pipes to allow the first purified water outlet portion to be connected to the second tap water inlet portion and to allow the second purified outlet portion to be connected to the third tap water inlet portion, and the outer partition wall has a caterpillar structure which surrounds overall the three purified water outlet portions, the three tap water inlet portions, and the inner partition wall, and wherein the bypass unit totally has a shape corresponding to the outer partition wall and comprises a plurality of tap water outlet holes at positions corresponding to the first tap water inlet portion of the cartridge enlargement unit.

9. The serial flow channel type filter cartridge of claim 3, wherein the cartridge enlargement unit has a structure in which three filter accommodating pipes which are disposed to allow edges to be adjacent to one another and have circular outer circumferences and triangularly connected central portions are formed on the bottom surface, the top surface has a shape in which perimeters of longitudinal edges formed at tops of the three filter accommodating pipes are connected as arcs in a three-leaf shamrock shape, first to third purified water outlet portions each formed as a single through hole are sequentially formed at positions on the top surface corresponding to central portions of the three filter accommodating pipes, first to third tap water inlet portions having semicircular shapes and formed of a plurality of through holes are formed outside the first to third purified water outlet portions, three or more inner partition walls are formed between the tap water inlet portion and the purified water outlet portion corresponding to each of the three filter accommodating pipes to allow the first purified water outlet portion to be connected to the second tap water inlet portion and to allow the second purified water outlet portion to be connected to the third tap water inlet portion counterclockwise, and the outer partition wall surrounds the inner partition wall at a certain interval and totally has a three-leaf shamrock shape, and wherein the bypass unit totally has a three-leaf shamrock shape and an external shape corresponding to the outer partition wall and comprises a plurality of tap water outlet holes at positions corresponding to the first tap water inlet portion of the cartridge enlargement unit.

10. The serial flow channel filter cartridge of claim 3, wherein the cartridge enlargement unit has a structure in which four filter accommodating pipes which are sequentially disposed to be adjacent one another and have circular outer circumferences and linearly connected central portions are formed on the bottom surface, the top surface has a shape in which perimeters of longitudinal edges formed at tops of the four filter accommodating pipes are linearly connected, four purified water outlet portions each formed as a single through hole are formed at positions on the top surface corresponding to central portions of the four filter accommodating pipes, first and fourth tap water inlet portions which have semicircular shapes outside first and fourth purified water outlet portions disposed on both edges of the four purified water outlet portions and are formed of a plurality of through holes are formed and second and third tap water inlet portions corresponding to second and third purified water outlet portions sequentially formed in a central portion are each formed of a single through hole, four inner partition walls are each formed between the tap water inlet portion and the purified water outlet portion corresponding to each of the three filter accommodating pipes to allow the first purified water outlet portion to be connected to the second tap water inlet portion, to allow the second purified outlet portion to be connected to the third tap water inlet portion, and to allow the third purified water outlet portion to be connected to the fourth tap water inlet portion, and the outer partition wall has a caterpillar structure outside the top surface to surround overall the four purified water outlet portions, the four tap water inlet portions, and the inner partition wall, and wherein the bypass unit totally has a shape corresponding to the outer partition wall and comprises a plurality of tap water outlet holes at positions corresponding to the first tap water inlet portion of the cartridge enlargement unit.

11. The serial flow channel type filter cartridge of claim 3, wherein the cartridge enlargement unit has a structure in which four filter accommodating pipes which are sequentially disposed to be adjacent to one another and have circular outer circumferences and rectangularly connected central portions are formed on the bottom surface, the top surface has a shape in which perimeters of longitudinal edges formed at tops of the four filter accommodating pipes are connected as arcs in a four-leaf shamrock shape, first to fourth purified water outlet portions each formed as a single through hole are sequentially formed at positions on the top surface corresponding to central portions of the four filter accommodating pipes, first to fourth tap water inlet portions having semicircular shapes and formed of a plurality of through holes are formed outside the first to fourth purified water outlet portions, four or more inner partition walls are formed between the tap water inlet portion and the purified water outlet portion corresponding to each of the four filter accommodating pipes to allow the first purified water outlet portion to be connected to the second tap water inlet portion, to allow the second purified water outlet portion to be connected to the third tap water inlet portion, and to allow the third purified water outlet portion to be connected to the fourth tap water inlet portion counterclockwise, and the outer partition wall surrounds the inner partition wall at a certain interval and totally has a four-leaf shamrock shape, and wherein the bypass unit totally has a four-leaf shamrock shape and an external shape corresponding to the outer partition wall and comprises a plurality of tap water outlet holes at positions corresponding to the first tap water inlet portion of the cartridge enlargement unit.

* * * * *